US009522663B2

(12) United States Patent
Ohnishi et al.

(10) Patent No.: US 9,522,663 B2
(45) Date of Patent: Dec. 20, 2016

(54) HYDRAULIC PRESSURE GENERATOR

(71) Applicants: HONDA MOTOR CO., LTD., Minato-Ku, Tokyo (JP); NISSIN KOGYO CO., LTD., Ueda-Shi, Nagano (JP)

(72) Inventors: Takaaki Ohnishi, Wako (JP); Motoyasu Nakamura, Ueda (JP); Masaki Kuramochi, Ueda (JP)

(73) Assignees: Honda Motor Co., Ltd., Tokyo (JP); Autoliv Nissin Brake Systems Japan Co., Ltd., Nagano (JP)

( * ) Notice: Subject to any disclaimer, the term of this patent is extended or adjusted under 35 U.S.C. 154(b) by 378 days.

(21) Appl. No.: 14/141,519

(22) Filed: Dec. 27, 2013

(65) Prior Publication Data
US 2014/0182283 A1 Jul. 3, 2014

(30) Foreign Application Priority Data

Dec. 28, 2012 (JP) .................................. 2012-288413

(51) Int. Cl.
*B60T 11/224* (2006.01)
*B60T 13/14* (2006.01)
(Continued)

(52) U.S. Cl.
CPC .............. *B60T 13/146* (2013.01); *B60T 7/042* (2013.01); *B60T 11/20* (2013.01); *B60T 11/228* (2013.01); *B60T 11/34* (2013.01); *B60T 13/745* (2013.01)

(58) Field of Classification Search
CPC ....... B60T 11/228; B60T 11/20; B60T 13/146; B60T 11/224
(Continued)

(56) References Cited

U.S. PATENT DOCUMENTS 4,773,224 A * 9/1988 Sakamoto ............... B60T 11/16
60/585
7,861,524 B2 1/2011 Kim
(Continued)

FOREIGN PATENT DOCUMENTS

DE   10 2008 013 348 A1   9/2008
EP         1 995 137 A1   11/2008
(Continued)

OTHER PUBLICATIONS

Extended European search report issued on Mar. 18, 2014 in the corresponding EP Patent Application 13199505.2.

Primary Examiner — F. Daniel Lopez
Assistant Examiner — Richard Drake
(74) Attorney, Agent, or Firm — Carrier Blackman & Associates, P.C.; Joseph P. Carrier; Jingli Wang

(57) ABSTRACT

A hydraulic-pressure generator including: primary and secondary pistons displaced corresponding to displacement of a brake pedal; a first pressure chamber communicating with a first hollow in the primary piston and generating in brake fluid hydraulic pressure corresponding to the displacement of the primary piston; a second pressure chamber communicating with a second hollow in the secondary piston and generating in the brake fluid hydraulic pressure corresponding to the displacement of the secondary piston; one or more first communication openings formed in a peripheral wall surrounding the first hollow; and second communication openings formed in a peripheral wall surrounding the second hollow. The flow rate of the brake fluid through the one or more first communication openings is different from the flow rate of the brake fluid through the second communication openings.

10 Claims, 6 Drawing Sheets

(51) Int. Cl.
*B60T 11/20* (2006.01)
*B60T 11/228* (2006.01)
*B60T 11/34* (2006.01)
*B60T 7/04* (2006.01)
*B60T 13/74* (2006.01)

(58) Field of Classification Search
USPC .................................. 303/15, 113.4
See application file for complete search history.

(56) References Cited

U.S. PATENT DOCUMENTS

| | | |
|---|---|---|
| 7,987,671 B2 | 8/2011 | Gaffe et al. |
| 2003/0084665 A1 | 5/2003 | Hirayama et al. |
| 2005/0103010 A1 | 5/2005 | Yasuda et al. |
| 2009/0090105 A1* | 4/2009 | Taira ..................... B60T 11/16 60/585 |
| 2009/0212621 A1 | 8/2009 | Drott et al. |
| 2010/0295365 A1 | 11/2010 | Nimura |
| 2013/0213033 A1* | 8/2013 | Konig .................. B60T 11/101 60/533 |
| 2014/0165553 A1* | 6/2014 | Rodriguez .............. B60T 11/16 60/533 |

FOREIGN PATENT DOCUMENTS

| | | |
|---|---|---|
| EP | 2 039 574 A1 | 3/2009 |
| FR | 2 961 460 A1 | 12/2011 |
| JP | 2012-210837 A | 11/2012 |
| WO | 2006100286 A1 | 9/2006 |
| WO | 2010/137059 A1 | 12/2010 |

\* cited by examiner

HYDRAULIC PRESSURE GENERATOR

CROSS REFERENCE TO RELATED APPLICATION

The application claims the foreign priority benefit under Title 35, United States Code, Section 119(a)-(d) of Japanese Patent Application No. 2012-288413 filed on Dec. 28, 2012, the contents of which are hereby incorporated by reference.

BACKGROUND OF THE INVENTION

Field of the Invention

The present invention relates to a hydraulic-pressure generator.

Description of the Related Art

A widely known hydraulic-pressure generator for a vehicle brake system includes a master cylinder in which two pistons are displaced by tread force with which a brake pedal is depressed, hydraulic pressure corresponding to the displacement of each piston is generated in the master cylinder, and the generated hydraulic pressures are supplied to hydraulic paths in two hydraulic routes. In the master cylinder in the above hydraulic-pressure generator, two pressure chambers realized by the two pistons and a cylinder tube enclosing the two pistons generate the hydraulic pressures, and rapid variations in the hydraulic pressures can cause slight turbulence in the rate of displacement of the brake pedal, and cause the driver to feel a sense of incongruity which deteriorates the brake feel (pedal feel). Therefore, it is desirable to suppress the above turbulence in the rate of displacement of the brake pedal. For example, International Patent Publication WO2010/137059 discloses a technique for improving the pedal feel when the brake pedal is depressed. The improvement is made by causing port openings (communication openings) provided for releasing the hydraulic pressures of two pressure chambers to open at different timings.

However, WO2010/137059 does not disclose a technique for reducing turbulence in the rate of displacement of the brake pedal when the brake pedal returns from a depressed state, although WO2010/137059 discloses the technique for improving the pedal feel when the brake pedal is depressed.

In view of above, the object of the present invention is to provide a hydraulic-pressure generator which can improve the brake feel when the brake pedal returns from a depressed state.

SUMMARY OF THE INVENTION

In order to achieve the above object, a hydraulic-pressure generator according to the present invention is provided. The hydraulic-pressure generator according to the present invention includes: a secondary piston which is connected with a brake pedal and is displaced in a cylinder tube accompanied by movement of the brake pedal; a primary piston which is displaced in the cylinder tube in response to displacement of the secondary piston; a first pressure chamber which is formed in the cylinder tube so as to communicate with a first hollow formed in the primary piston, and generates in brake fluid hydraulic pressure corresponding to displacement of the primary piston; a second pressure chamber which is formed in the cylinder tube so as to communicate with a second hollow formed in the secondary piston, and generates in the brake fluid hydraulic pressure corresponding to the displacement of the secondary piston; a reservoir which reserves the brake fluid, and communicates with the cylinder tube through a first relief port and a second relief port; one or more first communication openings which are formed in a peripheral wall surrounding the first hollow, and are switched between a first communicating state in which the one or more first communication openings communicate with the first relief port and a first non-communicating state in which the one or more first communication openings do not communicate with the first relief port; and one or more second communication openings which are formed in a peripheral wall surrounding the second hollow, and are switched between a second communicating state in which the one or more second communication openings communicate with the second relief port and a second non-communicating state in which the one or more second communication openings do not communicate with the second relief port. The hydraulic-pressure generator according to the present invention is configured such that the flow rate at which the brake fluid can flow through the one or more first communication openings is different from the flow rate at which the brake fluid can flow through the one or more second communication openings.

According to the present invention, the hydraulic-pressure generator can be configured such that the flow rate at which the brake fluid flows from the reservoir into the second pressure chamber (generating in the brake fluid the hydraulic pressure corresponding to the displacement of the secondary piston) is different from the flow rate at which the brake fluid flows from the reservoir into the first pressure chamber (generating in the brake fluid the hydraulic pressure corresponding to the displacement of the primary piston). According to the above configuration, it is possible to lower the lower one of the flow rate at which the brake fluid flows from the reservoir into the first pressure chamber and the flow rate at which the brake fluid flows from the reservoir into second pressure chambers. Therefore, although inflow of the brake fluid causes variations in the pressures of the first and second pressure chambers, the above configuration can reduce the variations in the pressure of the one of the first and second pressure chambers having the lower flow rate, and moderate the displacement of the secondary and primary pistons which is caused by the pressure of the one of the first and second pressure chambers having the lower flow rate. Thus, the displacement of the brake pedal connected to the secondary piston can be made moderate, so that the brake feel can be improved.

Preferably, in the hydraulic-pressure generator according to the present invention: the one or more first communication openings come into the first communicating state, and the one or more second communication openings come into the second communicating state, when the brake pedal comes to a predetermined home position; a first dead stroke which is defined as an amount of displacement of the primary piston in a time interval since the brake pedal is pressed down from the predetermined home position until the one or more first communication openings come into the first non-communicating state is different from a second dead stroke which is defined as an amount of displacement of the secondary piston in a time interval since the brake pedal is pressed down from the predetermined home position until the one or more second communication openings come into the second non-communicating state; and the flow rate at which the brake fluid can flow through the one or more first communication openings is lower than the flow rate at which the brake fluid can flow through the one or more second communication openings in the case where the first dead stroke is shorter than the second dead stroke, and the flow rate at which the brake fluid can flow through the one or more second communication openings is lower than the flow rate at which the brake fluid can flow through the one or more first communication openings in the case where the second dead stroke is shorter than the first dead stroke.

According to the present invention having the above feature, it is possible to lower the flow rate at which the brake fluid flows through the one or more communication openings formed in one of the primary and the secondary pistons having the shorter dead stroke. When the brake pedal is returned from a depressed state, the one or more communication openings formed in one of the primary and secondary pistons having the longer dead stroke come to communicate with the reservoir in advance of the one or more communication openings formed in the other of the primary and secondary pistons. That is, when the one or more communication openings formed in the other of the primary and secondary pistons having the shorter dead stroke come to communicate with the reservoir, the one or more communication openings formed in the one of the primary and secondary pistons having the longer dead stroke is already in communication with the reservoir.

Preferably, in the hydraulic-pressure generator according to the present invention, the one or more first communication openings are formed in plurality, the one or more second communication openings are formed in plurality, each of the one or more first communication openings and the one or more second communication openings has an identical aperture area, and the number of the one or more first communication openings is smaller than the number of the one or more second communication openings.

According to the present invention having the above feature, the number of the one or more first communication openings (formed in the primary piston) is smaller than the number of the one or more second communication openings (formed in the secondary piston). Therefore, the flow rate at which the brake fluid flows through the one or more first communication openings can be made lower than the flow rate at which the brake fluid flows through the one or more second communication openings.

Preferably, the hydraulic-pressure generator according to the present invention may further include a stroke simulator which generates reaction force imparted to the brake pedal when the brake pedal is depressed, and the stroke simulator generates the reaction force according to the hydraulic pressure of the brake fluid which is outputted from the first pressure chamber.

According to the present invention having the above feature, the stroke simulator can be connected to the first pressure chamber which is in communication with the first hollow in the primary piston, in which the one or more first communication openings (the number of which is smaller number of the one or more second communication openings) are formed.

According to the present invention, it is possible to provide a hydraulic-pressure generator which can improve the brake feel when the brake pedal returns from a depressed state.

DETAILED DESCRIPTION OF THE INVENTION

Figure 1:
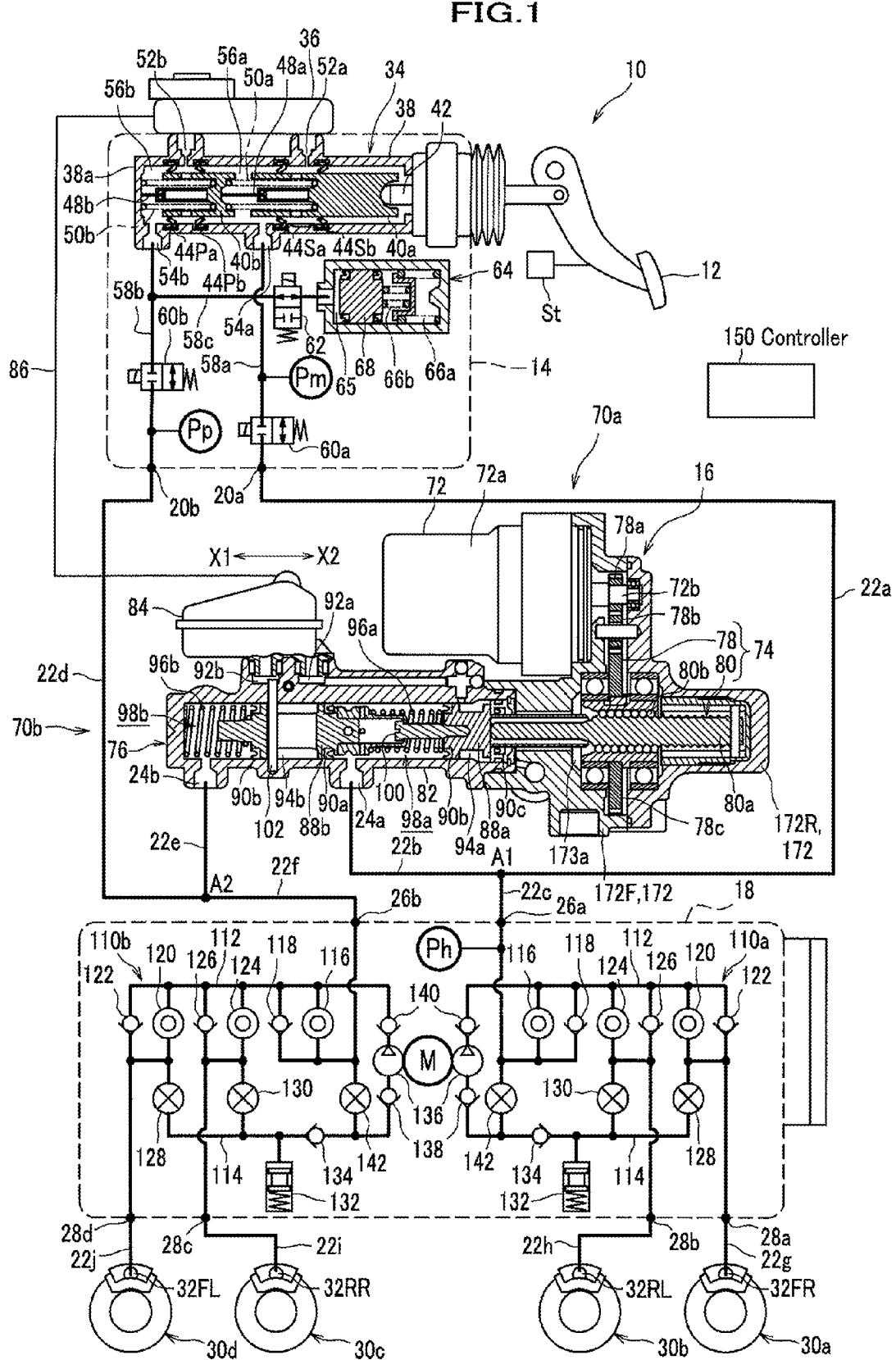
FIG. 1 schematically illustrates the arrangement of a vehicle brake system according to an embodiment of the present invention.

An embodiment of the present invention is explained below with reference to the accompanying drawings as needed. FIG. 1 schematically illustrates the arrangement of a vehicle brake system according to the embodiment of the present invention.

The vehicle brake system 10 illustrated in FIG. 1 includes both of a brake-by-wire system for normal use and a conventional hydraulic brake system for fail-safe. The brake is operated by transmission of an electric signal in the brake-by-wire system, and by hydraulic transmission in the conventional hydraulic brake system.

Specifically, as illustrated in FIG. 1, the vehicle brake system 10 is constituted by a hydraulic-pressure generator (input apparatus) 14, a pedal-stroke sensor St, an electric brake actuator (motor cylinder apparatus) 16, and a vehicle stability assist (VSA) apparatus 18, which are separately arranged. The input apparatus 14 generates in brake fluid (as hydraulic fluid) hydraulic pressure corresponding to a manipulation input when the manipulation input is made by the driver on a brake manipulation unit, e.g., a brake pedal 12. The pedal-stroke sensor St measures the amount of manipulation (stroke) of the brake pedal 12 when the brake pedal 12 is pressed. The electric brake actuator 16 generates in the brake fluid (hydraulic fluid) hydraulic pressure (hydraulic brake pressure) to be applied to the wheel cylinders 32FR, 32RL, 32RR, and 32FL. The VSA apparatus 18 assists in stabilizing the vehicle behavior. (VSA® is a registered trademark.)

The input apparatus 14, the motor cylinder apparatus 16, and the VSA apparatus 18 are connected through tubular paths (hydraulic paths) formed with tubular materials such as hoses or tubes, and the input apparatus 14 and the motor cylinder apparatus 16 are electrically connected through wiring harness (not shown) so as to constitute the brake-by-wire system.

In the hydraulic paths, a connection port 20a of the input apparatus 14 is connected to a connection point A1 (which is indicated on the slightly below the center of FIG. 1 and is regarded as a reference point) through a first piping tube 22*a*, an outlet port 24*a* of the motor cylinder apparatus 16 is also connected to the connection point A1 through a second piping tube 22*b*, and an inlet port 26*a* of the VSA apparatus 18 is connected to the connection point A1 through a third piping tube 22*c*.

In addition, another connection port 20*b* of the input apparatus 14 is connected to another connection point A2 (which is regarded as another reference point) through a fourth piping tube 22*d*, another outlet port 24*b* of the motor cylinder apparatus 16 is also connected to the connection point A2 through a fifth piping tube 22*e*, and another inlet port 26*b* of the VSA apparatus 18 is connected to the connection point A2 through a sixth piping tube 22*f*.

The VSA apparatus 18 has a plurality of outlet ports 28*a* to 28*d*. The first outlet port 28*a* is connected through a seventh piping tube 22*g* to a wheel cylinder 32FR in a disk brake mechanism 30*a* for the right front wheel, the second outlet port 28*b* is connected through an eighth piping tube 22*h* to a wheel cylinder 32RL in a disk brake mechanism 30*b* for the left rear wheel, the third outlet port 28*c* is connected through a ninth piping tube 22*i* to a wheel cylinder 32RR in a disk brake mechanism 30*c* for the right rear wheel, and the fourth outlet port 28*d* is connected through a tenth piping tube 22*j* to a wheel cylinder 32FL in a disk brake mechanism 30*d* for the left front wheel.

In the above arrangement, the brake fluid is supplied to the wheel cylinders 32FR, 32RL, 32RR, and 32FL in the disk brake mechanisms 30*a* to 30*d* through the seventh to tenth piping tubes 22*g* to 22*j* connected to the outlet ports 28*a* to 28*d*, respectively. Therefore, when the hydraulic pressure in the wheel cylinders 32FR, 32RL, 32RR, and 32FL rise, the wheel cylinders 32FR, 32RL, 32RR, and 32FL operate, and exert braking force on the respectively corresponding wheels (i.e., the right front wheel, the left rear wheel, the right rear wheel, and the left front wheel).

The vehicle brake system 10 can be mounted on each of the vehicles including the internal-combustion-engine vehicles, hybrid electric vehicles, electric vehicles, and fuel-cell vehicles. In addition, the vehicle brake system 10 is not limited by the type of driving of the vehicle, and can be mounted on vehicles of any driving type, for example, the front-wheel drive, the rear-wheel drive, or the four-wheel drive.

The input apparatus 14 includes a master cylinder 34 and a reservoir which is attached to the master cylinder 34 (and is hereinafter referred to as the first reservoir 36). The master cylinder 34 is a tandem type, and can generate hydraulic pressure in the brake fluid in response to manipulation of the brake pedal 12 by the driver. The master cylinder 34 has a cylinder tube 38, in which two pistons 40*a* and 40*b* (the secondary piston 40*a* and the primary piston 40*b*) are arranged in such a manner that the two pistons 40*a* and 40*b* are a predetermined distance apart from each other and slidable along the direction of the cylinder tube 38. The secondary piston 40*a* is arranged nearer to the brake pedal 12, is connected to the brake pedal 12 through a pushrod 42, and is directly moved by the brake pedal 12 through the pushrod 42. The primary piston 40*b* is arranged farther from the brake pedal 12 than the secondary piston 40*a*.

A pair of ring-shaped cup seals 44Pa and 44Pb and a pair of ring-shaped cup seals 44Sa and 44Sb are attached to the inner wall of the cylinder tube 38 in such a manner that the cup seals 44Pa and 44Pb are in slidable contact with the outer peripheral surface of the primary piston 40*b* and the cup seals 44Sa and 44Sb are in slidable contact with the outer peripheral surface of the secondary piston 40*a*. In addition, a spring member 50*a* is arranged between the primary piston 40*b* and the primary piston 40*b*, and another spring member 50*b* is arranged between the primary piston 40*b* and a side end portion (wall) 38*a* on the closed end side of the cylinder tube 38.

Further, a guide rod 48*b* is extended along the slide direction of the primary piston 40*b* from the side end portion 38*a* of the cylinder tube 38, and the primary piston 40*b* slides by being guided by the guide rod 48*b*. In addition, a guide rod 48*a* is extended along the slide direction of the secondary piston 40*a* from the end portion on the secondary piston 40*a* side of the primary piston 40*b*, and the secondary piston 40*a* slides by being guided by the guide rod 48*a*. Furthermore, the secondary piston 40*a* and the primary piston 40*b* are connected with the guide rod 48*a*, and arranged in series. Details of the guide rods 48*a* and 48*b* will be explained later.

Moreover, two relief ports (the second relief port 52*a* and the first relief port 52*b*) and two output ports 54*a* and 54*b* are arranged in the cylinder tube 38 in the master cylinder 34. In addition, the pair of cup seals 44Sa and 44Sb in slidable contact with the outer peripheral surface of the secondary piston 40*a* are arranged on the front and rear sides of the second relief port 52*a* in the slide direction of the secondary piston 40*a*, and the pair of cup seals 44Pa and 44Pb in slidable contact with the outer peripheral surface of the primary piston 40*b* are arranged on the front and rear sides of the first relief port 52*b* in the slide direction of the primary piston 40*b*.

Further, a second pressure chamber 56*a* and a first pressure chamber 56*b* are realized in the cylinder tube 38 in the master cylinder 34. Hydraulic pressures corresponding to the tread force with which the brake pedal 12 is depressed by the driver is generated in the first and second pressure chambers 56*b* and 56*a*. The second pressure chamber 56*a* is connected to the connection port 20*a* through a second hydraulic path 58*a*, and the first pressure chamber 56*b* is connected to the other connection port 20*b* through a first hydraulic path 58*b*. The first pressure chamber 56*b* is partitioned off by the cup seal 44Pa and the side end portion (wall) 38*a*, and the second pressure chamber 56*a* is partitioned off by the cup seal 44Pb and the cup seal 44Sa.

The first pressure chamber 56*b* is configured to generate hydraulic pressure corresponding to the amount of displacement of the secondary piston 40*a*, and the second pressure chamber 56*a* is configured to generate hydraulic pressure corresponding to the amount of displacement of the secondary piston 40*a*. The secondary piston 40*a* is connected to the brake pedal 12 through the pushrod 42, and displaced in the cylinder tube 38 accompanied by the movement of the brake pedal 12, and the primary piston 40*b* is displaced by the hydraulic pressure which is generated in the second pressure chamber 56*a* by the displacement of the secondary piston 40*a*. That is, the primary piston 40*b* is displaced in response to the movement of the secondary piston 40*a*.

In addition, a pressure sensor Pm is arranged on the upstream side of the second hydraulic path 58*a* between the master cylinder 34 and the connection port 20*a*, and a second shutoff valve 60*a* realized by a normally-open solenoid valve is arranged on the downstream side of the second hydraulic path 58*a*. The pressure sensor Pm measures the hydraulic pressure on the upstream side of the second hydraulic path 58*a* (i.e., on the master cylinder 34 side of the second shutoff valve 60*a* in the second hydraulic path 58*a*).

Further, a first shutoff valve 60*b* realized by a normally-open solenoid valve is arranged on the upstream side of the first hydraulic path 58*b* between the master cylinder 34 and the connection port 20*b*, and a pressure sensor Pp is arranged on the downstream side of the first hydraulic path 58b. The pressure sensor Pp measures the hydraulic pressure on the downstream side of the first shutoff valve 60b (i.e., on the wheel cylinders 32FR, 32RL, 32RR, and 32FL side of the first shutoff valve 60b in the first hydraulic path 58b).

The normally-open solenoid valves realizing the first and second shutoff valves 60b and 60a are valves in which the normal position of the valve element (i.e., the position of the valve element when the valves are unenergized) is open. FIG. 1 shows the closed states of the first and second shutoff valves 60b and 60a in which solenoids in the first and second shutoff valves 60b and 60a are energized so that valve elements (not shown) are activated.

Further, a hydraulic branch path 58c branches off from a part of the first hydraulic path 58b between the master cylinder 34 and the first shutoff valve 60b, and a third shutoff valve 62 and a stroke simulator 64 are connected in series to the hydraulic branch path 58c. The third shutoff valve 62 is realized by a normally-closed solenoid valve. The normally-closed solenoid valve realizing the third shutoff valve 62 is a valve in which the normal position of the valve element (i.e., the position of the valve element when the valve is unenergized) is closed. FIG. 1 shows the open state of the third shutoff valve 62 in which a solenoid in the third shutoff valve 62 is energized so that a valve element (not shown) is activated.

This stroke simulator 64 generates a brake stroke and reaction force during the break-by-wire control for making the driver feel as if braking force were directly generated by the tread force. The stroke simulator 64 is arranged on the master cylinder 34 side of the first shutoff valve 60b in the first hydraulic path 58b. A hydraulic chamber 65, which is connected to the hydraulic branch path 58c, is arranged in the stroke simulator 64 so as to be able to absorb the brake fluid delivered from the second pressure chamber 56b in the master cylinder 34.

In addition, the stroke simulator 64 includes first and second return springs 66a and 66b and a simulator piston 68. The first and second return springs 66a and 66b are arranged in series, and the simulator piston 68 is energized by the first and second return springs 66a and 66b. The spring constant of the first return spring 66a is great, and the spring constant of the second return spring 66b is small. The first and second return springs 66a and 66b and the simulator piston 68 are arranged in such a manner that the increase rate of the pedal reaction force is weak in the beginning stage of depression of the brake pedal 12, and the pedal reaction force becomes strong in the later stage of the depression of the brake pedal 12, i.e., the pedal feel equivalent to the conventional master cylinder is provided to the driver. That is, the stroke simulator 64 is configured to generate reaction force corresponding to the hydraulic pressure of the brake fluid delivered from the first pressure chamber 56b, and provide the reaction force to the brake pedal 12 through the master cylinder 34. Details of the master cylinder 34 will be explained later.

The hydraulic paths can be roughly divided into first and second hydraulic circuits 70b and 70a. The second hydraulic circuit 70a connects the second pressure chamber 56a in the master cylinder 34 to the wheel cylinders 32FR and 32RL, and the first hydraulic circuit 70b connects the first pressure chamber 56b in the master cylinder 34 to the wheel cylinders 32RR and 32FL.

The second hydraulic circuit 70a is constituted by the second hydraulic path 58a connecting the outlet port 54a of the master cylinder 34 (i.e., the outlet port 54a of the cylinder tube 38) to the connection port 20a in the input apparatus 14, the first and second piping tubes 22a and 22b connecting the connection port 20a of the input apparatus 14 to the outlet port 24a of the motor cylinder apparatus 16, the second and third piping tubes 22b and 22c connecting the outlet port 24a of the motor cylinder apparatus 16 to the inlet port 26a of the VSA apparatus 18, and the seventh and eighth piping tubes 22g and 22h respectively connecting the first and second outlet ports 28a and 28b of the VSA apparatus 18 to the wheel cylinders 32FR and 32RL.

The first hydraulic circuit 70b is constituted by the first hydraulic path 58b connecting the outlet port 54b of the master cylinder 34 (i.e., the outlet port 54b of the cylinder tube 38) to the connection port 20b in the input apparatus 14, the fourth and fifth piping tubes 22d and 22e connecting the connection port 20b of the input apparatus 14 to the outlet port 24b of the motor cylinder apparatus 16, the fifth and sixth piping tubes 22e and 22f connecting the outlet port 24b of the motor cylinder apparatus 16 to the inlet port 26b of the VSA apparatus 18, and the ninth and tenth piping tubes 22i and 22j respectively connecting the third and fourth outlet ports 28c and 28d of the VSA apparatus 18 to the wheel cylinders 32RR and 32FL.

The motor cylinder apparatus 16 includes an electric motor 72, an actuator mechanism 74, and a cylinder mechanism 76. The cylinder mechanism 76 is actuated by the actuator mechanism 74.

The actuator mechanism 74 contains a gear mechanism (deceleration mechanism) 78 and a ball-screw structure 80. The gear mechanism 78 is arranged on the output shaft 72b side of the electric motor 72, has multiplier gears, and transmits the rotational driving force of the electric motor 72 by engagement of the multiplier gears. The ball-screw structure 80 is constituted by a ball-screw shaft 80a and balls 80b. The rotational driving force is transmitted to the ball-screw structure 80 through the gear mechanism 78, and the ball-screw shaft 80a moves back and forth along the axis of the shaft according to the transmitted rotational driving force. In the present embodiment, the ball-screw structure 80, together with the gear mechanism 78, is enclosed in a mechanism enclosing portion 173a of an actuator housing 172.

The cylinder mechanism 76 includes a cylinder body 82 and a second reservoir 84. The cylinder body 82 has an approximately cylindrical shape, and the second reservoir 84 is directly attached to the cylinder body 82. The second reservoir 84 is arranged to be connected through a piping tube 86 to the first reservoir 36 (which is attached to the master cylinder 34 in the input apparatus 14) such that the brake fluid reserved in the first reservoir 36 is supplied to the second reservoir 84 through the piping tube 86. A reservoir for reserving the brake fluid may be arranged in the piping tube 86. The actuator housing 172 is constituted by a housing body 172F and a housing cover 172R, and an open end portion of the cylinder body 82 (having a cylindrical shape) is fitted into the actuator housing 172, so that the cylinder body 82 is coupled to the actuator housing 172. Thus, the motor cylinder apparatus 16 is constituted.

In the cylinder body 82, a second slave piston 88a and a first slave piston 88b are slidably arranged in such a manner that the first and second slave pistons 88b and 88a are a predetermined distance apart from each other along the direction of the axis of the cylinder body 82. The second slave piston 88a is arranged close to the ball-screw structure 80 in contact with an end portion of the ball-screw shaft 80a such that the second slave piston 88a is displaced integrally with the ball-screw shaft 80a in the direction indicated by the arrow X1 or X2. The first slave piston 88b is arranged more apart from the ball-screw structure 80 than the second slave piston 88a.

In addition, the electric motor 72 in the present embodiment is arranged to be covered by a motor casing 72a which is formed separately from the cylinder body 82 in such a manner that the output shaft 72b is approximately parallel to the slide direction (axial direction) of the first and second slave pistons 88b and 88a and the drive rotation of the output shaft 72b is transmitted to the ball-screw structure 80 through the gear mechanism 78.

The gear mechanism 78 is constituted by first, second, and third gears 78a, 78b, and 78c. The first gear 78a is attached to the output shaft 72b of the electric motor 72, the second gear 78b transmits the rotation of the third gear 78c, and the third gear 78c causes the balls 80b to rotate around the axis of the ball-screw shaft 80a, where the balls 80b moves back and forth the ball-screw shaft 80a along the direction of the axis of the ball-screw shaft 80a.

The actuator mechanism 74 in the present embodiment converts the rotational drive force of the output shaft 72b of the electric motor 72 to back-and-forth drive force (linear drive force) of the ball-screw shaft 80a by the above construction.

A pair of slave cup seals 90a and 90b are respectively attached to the outer peripheral surfaces of the annular step portions of the first slave piston 88b. In addition, a first back chamber 94b communicating with a reservoir port 92b is formed between the slave cup seals 90a and 90b. The first back chamber 94b and the reservoir port 92b are described later. Further, a second return spring 96a is arranged between the first and second slave pistons 88b and 88a, and a first return spring 96b is arranged between the first slave piston 88b and the side end portion of the cylinder body 82.

Furthermore, an annular guide piston 90c is arranged on the rear side of the second slave piston 88a as a sealing member which closes the cylinder body 82. The guide piston 90c forms a fluid-tight seal between the outer peripheral surface of the second slave piston 88a and the mechanism enclosing portion 173a, and guides the second slave piston 88a such that the second slave piston 88a can move along the direction of the axis of the second slave piston 88a. In addition, it is preferable that a slave cup seal (not shown) be attached to the inner peripheral surface of the guide piston 90c (through which the second slave piston 88a is inserted) such that a fluid-tight seal is formed between the outer peripheral surface of the second slave piston 88a and the guide piston 90c. Further, a slave cup seal 90b is arranged on the outer peripheral surface of an annular step portion of the forward side of the second slave piston 88a. According to the above arrangement, the brake fluid with which the inside of the cylinder body 82 is filled is sealed in the cylinder body 82 by the guide piston 90c, and does not flow into the actuator housing 172 side. In addition, a second back chamber 94a communicating with a reservoir port 92a is formed between the guide piston 90c and the slave cup seal 90b on the second slave piston 88a. The second back chamber 94a and the reservoir port 92a are described later.

The two reservoir ports 92a and 92b and the two outlet ports 24a and 24b are arranged in the cylinder body 82 in the cylinder mechanism 76. In this case, the reservoir ports 92a and 92b are arranged to communicate with a reservoir chamber (not shown) in the second reservoir 84.

In addition, first and second hydraulic chambers 98b and 98a are arranged in the cylinder body 82. The second hydraulic chamber 98a controls the hydraulic brake pressure outputted from the outlet port 24a to the wheel cylinders 32FR and 32RL, and the first hydraulic chamber 98b controls the hydraulic brake pressure outputted from the outlet port 24b to the wheel cylinders 32RR and 32FL.

In the above arrangement, the first and second back chambers 94b and 94a and the first and second hydraulic chambers 98b and 98a in the cylinder body 82 are spaces which are filled with the brake fluid are fluid tightly (and air tightly) separated from the mechanism enclosing portion 173a in the actuator housing 172 by the guide piston 90c (which functions as the sealing member). However, the manner of attaching the guide piston 90c to the cylinder body 82 is not specifically limited to the explained manner. For example, the guide piston 90c may be attached with a circlip (not shown).

A restriction means 100 which restricts the maximum strokes (the maximum displacement) and the minimum strokes (the minimum displacement) of the first and second slave pistons 88b and 88a is arranged between the first and second slave pistons 88b and 88a. In addition, a stopper pin 102 is arranged in the first slave piston 88b. The stopper pin 102 restricts the slidable range of the first slave piston 88b, and prevents overreturn of the first slave piston 88b toward the second slave piston 88a. Therefore, when the braking operation is backed up with the hydraulic brake pressure generated by the master cylinder 34, it is possible to prevent occurrence of a failure in one of the hydraulic circuits even when the other of the hydraulic circuits fails.

The VSA apparatus 18 includes first and second brake systems 110b and 110a. The second brake system 110a controls the second hydraulic circuit 70a connected to (the wheel cylinders 32FR and 32RL in) the disk brake mechanisms 30a and 30b for the right front wheel and the left rear wheel, and the first brake system 110b controls the first hydraulic circuit 70b connected to (the wheel cylinders 32RR and 32FL in) the disk brake mechanisms 30c and 30d for the right rear wheel and the left front wheel. Alternatively, the second brake system 110a may be constituted by hydraulic circuits connected to the disk brake mechanisms arranged for the right front wheel and the left front wheel, and the first brake system 110b may be constituted by hydraulic circuits connected to the disk brake mechanisms arranged for the right rear wheel and the left rear wheel. Further alternatively, the second brake system 110a may be constituted by hydraulic circuits connected to the disk brake mechanisms arranged for the right front wheel and the right rear wheel, and the first brake system 110b may be constituted by hydraulic circuits connected to the disk brake mechanisms arranged for the left front wheel and the left rear wheel.

Since the first and second braking systems 110b and 110a have identical structures, identical reference numbers are assigned to equivalent elements in the first and second braking systems 110b and 110a in FIG. 1. The following explanations are focused on the second braking system 110a, and the explanations on the first braking system 110b are indicated in parentheses.

The second braking system 110a (or the first braking system 110b) includes tubular paths as the first and second common hydraulic paths 112 and 114, which are common to the wheel cylinders 32FR and 32RL (or common to the wheel cylinders 32RR and 32FL). The VSA apparatus 18 includes a regulator valve 16, first, second, and third check valves 118, 122, and 126, and first and second in-valves 120 and 124. The regulator valve 116 is realized by a normally-open solenoid valve, and arranged between the inlet port 26a and the first common hydraulic path 112 (or between the inlet port 26b and the first common hydraulic path 112). The first check valve 118 is arranged parallel with the above regulator valve 116, and allows passage of the brake fluid from the inlet port 26*a* side (or from the inlet port 26*b* side) to the first common hydraulic path 112 side (and stops passage of the brake fluid from the first common hydraulic path 112 side to the inlet port 26*a* side (or to the inlet port 26*b* side). The first in-valve 120 is realized by a normally-open solenoid valve, and arranged between the first common hydraulic path 112 and the first outlet port 28*a* (or between the first common hydraulic path 112 and the fourth outlet port 28*d*). The second check valve 122 is arranged parallel with the above first in-valve 120, and allows passage of the brake fluid from the first outlet port 28*a* side (or from the fourth outlet port 28*d* side) to the first common hydraulic path 112 side (and stops passage of the brake fluid from the first common hydraulic path 112 side to the first outlet port 28*a* side (or to the fourth outlet port 28*d* side)). The second in-valve 124 is realized by a normally-open solenoid valve, and arranged between the first common hydraulic path 112 and the second outlet port 28*b* (or between the first common hydraulic path 112 and the third outlet port 28*c*). The third check valve 126 is arranged parallel with the above second in-valve 124, and allows passage of the brake fluid from the second outlet port 28*b* side (or from the third outlet port 28*c* side) to the first common hydraulic path 112 side (and stops passage of the brake fluid from the first common hydraulic path 112 side to the second outlet port 28*b* side (or to the third outlet port 28*c* side)).

Further, the VSA apparatus 18 includes first and second out-valves 128 and 130, a reservoir 132, a fourth check valve 134, a pump 136, suction valves 138 and 142, a discharge valve 140, and a motor M. The first out-valve 128 is realized by a normally-closed solenoid valve, and arranged between the first outlet port 28*a* and the second common hydraulic path 114 (or between the fourth outlet port 28*d* and the second common hydraulic path 114). The second out-valve 130 is realized by a normally-closed solenoid valve, and arranged between the second outlet port 28*b* and the second common hydraulic path 114 (or between the third outlet port 28*c* and the second common hydraulic path 114). The reservoir 132 is connected to the second common hydraulic path 114. The fourth check valve 134 is arranged between the first common hydraulic path 112 and the second common hydraulic path 114, and allows passage of the brake fluid from the second common hydraulic path 114 side to the first common hydraulic path 112 side (and stops passage of the brake fluid from the first common hydraulic path 112 side to the second common hydraulic path 114 side). The pump 136 is arranged between the fourth check valve 134 and the first common hydraulic path 112, and supplies the brake fluid from the second common hydraulic path 114 side to the first common hydraulic path 112 side. The suction valve 138 and the discharge valve 140 are respectively arranged on the front and rear sides of the pump 136. The motor M drives the pump 136. The suction valve 142 is realized by a normally-closed solenoid valve, and arranged between the second common hydraulic path 114 and the inlet port 26*a* (or between the second common hydraulic path 114 and the inlet port 26*b*).

Furthermore, a pressure sensor Ph is arranged on the hydraulic path close to the inlet port 26*a* in the second braking system 110*a*, and detects the pressure of the brake fluid which is delivered from the outlet port 24*a* of the motor cylinder apparatus 16 and controlled in the second hydraulic pressure chamber 98*a* in the motor cylinder apparatus 16. Each of the pressure sensors Pm, Pp, and Ph generates a detection signal representing the detected pressure, and supplies the detection signal to a controller 150. The VSA apparatus 18 also performs ABS (antilock brake system) control as well as the VSA (vehicle stability assist) control, although an ABS apparatus having only the ABS function, instead of the VSA apparatus 18, may be connected. The vehicle brake system 10 according to the present embodiment is basically constructed as above. The operations and advantages of the vehicle brake system 10 are explained below.

During normal operation of the vehicle brake system 10, the first and second shutoff valves 60*b* and 60*a* (respectively realized by normally-open solenoid valves) are energized to be closed, and the third shutoff valve 62 (realized by a normally-closed solenoid valve) is energized to be opened. Since the first and second hydraulic circuits 70*b* and 70*a* are closed by the first and second shutoff valves 60*b* and 60*a*, the hydraulic brake pressure generated in the master cylinder 34 in the input apparatus 14 is not transmitted to the wheel cylinders 32FR, 32RL, 32RR, and 32FL in the disk brake mechanisms 30*a* to 30*d*.

At this time, the hydraulic brake pressure generated in the second pressure chamber 56*b* in the master cylinder 34 is transmitted to the hydraulic pressure chamber 65 in the stroke simulator 64 through the hydraulic branch path 58*c* and the third shutoff valve 62 (which is open). The hydraulic brake pressure transmitted to the hydraulic pressure chamber 65 causes the simulator piston 68 to move against the spring force produced by the spring members 66*a* and 66*b*. Therefore, the brake pedal 12 is allowed to move, and the hydraulic brake pressure in the hydraulic pressure chamber 65 generates dummy pedal reaction force, and imparts the dummy pedal reaction force to the brake pedal 12, so that a normal brake feel is provided to the driver without causing a sense of incongruity.

In the case where the vehicle brake system 10 is arranged as above, when the controller 150 detects depression of the brake pedal 12 by the driver, the controller 150 activates the electric motor 72 in the motor cylinder apparatus 16 so as to energize the actuator mechanism 74, and causes displacement of the first and second slave pistons 88*b* and 88*a* toward the direction indicated by the arrow X1 in FIG. 1, against the spring force generated by the first and second return springs 96*b* and 96*a*. The displacement of the first and second slave pistons 88*b* and 88*a* presses the brake fluid in the first and second hydraulic pressure chambers 98*b* and 98*a* such that the brake fluid in the first and second hydraulic pressure chambers 98*b* and 98*a* balances and generates a desired hydraulic brake pressure is generated in the first and second hydraulic chambers 98*b* and 98*a*.

Specifically, the control means 150 calculates the amount of depression of the brake pedal 12 (i.e., the brake depression amount) on the basis of a value obtained by measurement by the pedal-stroke sensor St, and sets a target value of the hydraulic brake pressure (i.e., the target hydraulic pressure) in consideration of the regenerative braking force, and causes the motor cylinder apparatus 16 to generate the target hydraulic pressure. Then, the hydraulic brake pressure generated by the motor cylinder apparatus 16 is applied through the inlet ports 26*a* and 26*b* to the VSA apparatus 18. That is, when the brake pedal 12 is manipulated, the electric motor 72 is rotationally driven in response to an electric signal, the first and second slave pistons 88*b* and 88*a* are actuated by the rotational drive force of the electric motor 72, so that the hydraulic brake pressure corresponding to the amount of manipulation of the brake pedal 12 is generated and applied to the VSA apparatus 18. The electric signals in the present embodiment are a signal for supplying electric power to the electric motor 72 and control signals for controlling the electric motor 72.

The control means 150 is constituted by a microprocessor and peripheral devices (which are not shown), where the microprocessor is constituted by, for example, a CPU (central processing unit), a ROM (read only memory), a RAM (random access memory), and the like. In the control means 150, the CPU executes programs which are stored in the ROM in advance, for controlling the vehicle brake system 10.

The pedal-stroke sensor St realizes a manipulation-amount measurement means which measures the amount of depression of the brake pedal 12. However, the manipulation-amount measurement means is not limited to the pedal-stroke sensor St, and may be realized by any sensor which can measure the amount of depression of the brake pedal 12. For example, the manipulation-amount measurement means may be a type which converts the hydraulic pressure measured by the pressure sensor Pm, into the amount of depression of the brake pedal 12, or a type which measures the amount of depression of the brake pedal 12 by a tread-force sensor (not shown).

The hydraulic brake pressure in the first and second hydraulic chambers 98b and 98a in the motor cylinder apparatus 16 is transmitted to the wheel cylinders 32FR, 32RL, 32RR, and 32FL in the disc brake mechanisms 30a to 30d through the first and second in-valves 120 and 124 in the VSA apparatus 18, which are in the valve-open state, so that the wheel cylinders 32FR, 32RL, 32RR, and 32FL are actuated and desired braking force is exerted on the respective wheels.

In other words, during normal operation of the vehicle brake system 10 according to the present embodiment in which the motor cylinder apparatus 16 (which functions as a hydraulic power source), the control means 150 (which performs the brake-by-wire control), and other functions of the vehicle brake system 10 can operate, the aforementioned brake-by-wire system becomes active. In the brake-by-wire system, the disc brake mechanisms 30a to 30d (which has the wheel cylinders 32FR, 32RL, 32RR, and 32FL and brakes the respective wheels) are activated by the hydraulic brake pressure generated by the motor cylinder apparatus 16, while the first and second shutoff valves 60a and 60b shut off the disc brake mechanisms 30a to 30d from the master cylinder 34 (which generates hydraulic pressure when the driver depresses the brake pedal 12). Therefore, the present embodiment can be preferably applied to the vehicles (e.g., electric vehicles) which cannot use the negative pressure produced by the internal combustion engine (although such negative pressure has been conventionally used).

On the other hand, under abnormal conditions in which the motor cylinder apparatus 16 or the like cannot operate, the first and second shutoff valves 60a and 60b are opened and the third shutoff valve 62 is closed, so that the hydraulic brake pressure generated in the master cylinder 34 is transmitted to (the wheel cylinders 32FR, 32RL, 32RR, and 32FL in) the disc brake mechanisms 30a to 30d, and the disc brake mechanisms 30a to 30d are activated by the hydraulic brake pressure transmitted from the master cylinder 34. That is, the so-called traditional hydraulic brake system operates.

For example, the hybrid vehicles and the electric vehicles having one or more electric drive motors can be provided with a regenerative brake which generates braking force by regenerative power generation by the electric drive motor. In the case where the regenerative brake is used in such vehicles, the control means 150 causes one or more motors coupled to at least one of the front and rear shafts to operate as an electric generator and generate regenerative braking force corresponding to the amount of depression of the brake pedal 12. When the regenerative braking force is insufficient for the amount of depression of the brake pedal 12 (i.e., when the regenerative braking force is insufficient for the braking force required by the driver), the control means 150 drives the electric motor 72 and causes the motor cylinder apparatus 16 to generate braking force. Thus, the control means 150 performs cooperative control of the regenerative brake and the hydraulic brake (which is realized by the motor cylinder apparatus 16). The cooperative control can be realized by configuring the control means 150 to determine the amount of operation in the motor cylinder apparatus 16 in a known manner. For example, the control means 150 can be configured to determine the amount of operation in the motor cylinder apparatus 16 by setting as the target hydraulic pressure a hydraulic brake pressure for causing the motor cylinder apparatus 16 to generate the braking force equal to the difference between the regenerative braking force and the (total) braking force determined in correspondence with the amount of depression of the brake pedal 12, or setting as the target hydraulic pressure a hydraulic brake pressure for causing the motor cylinder apparatus 16 to generate the braking force at a predetermined ratio to the total braking force.

Figure 2:
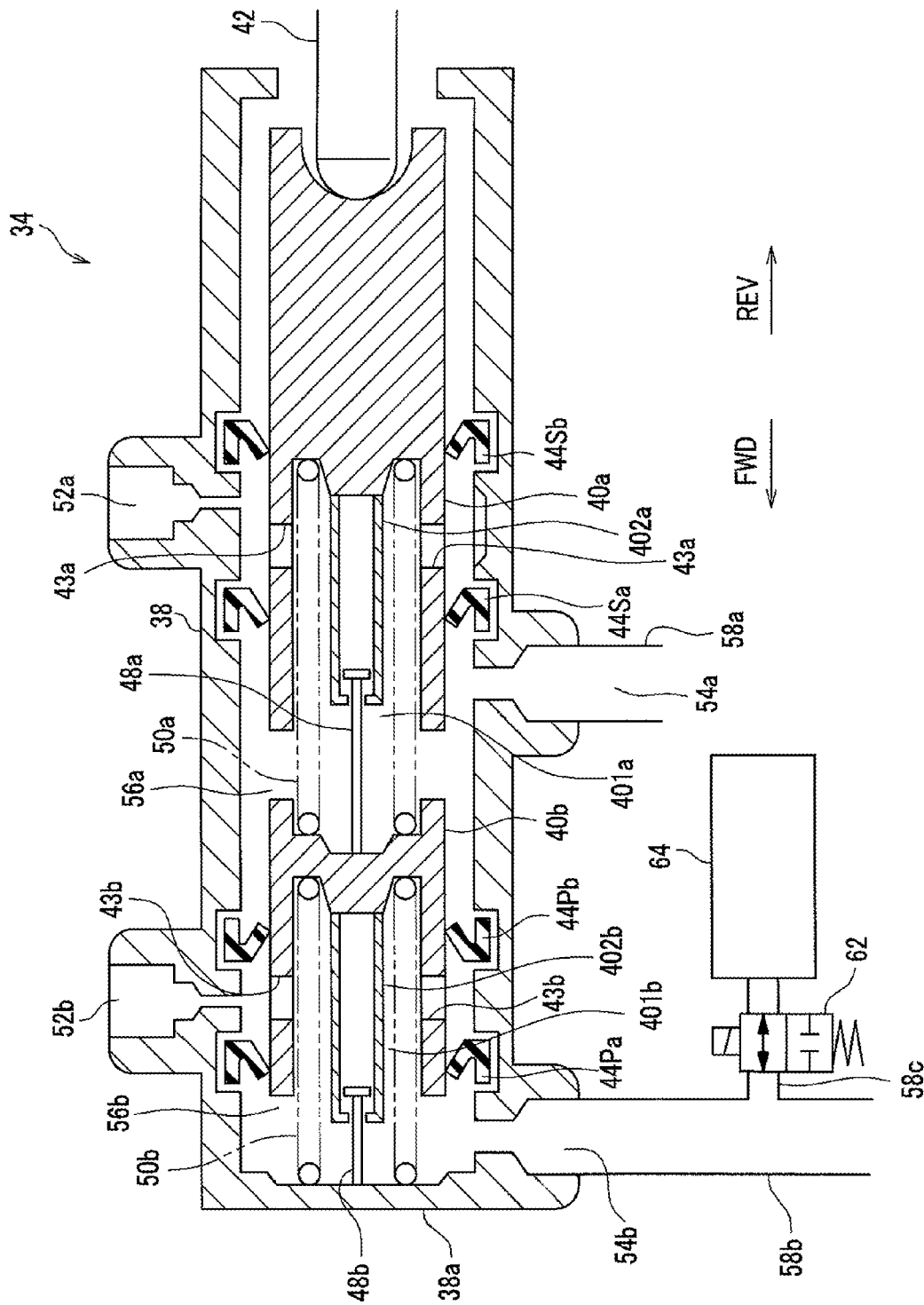
FIG. 2 is a sectional view illustrating the structure of a master cylinder according to the embodiment.
Figure 3A:
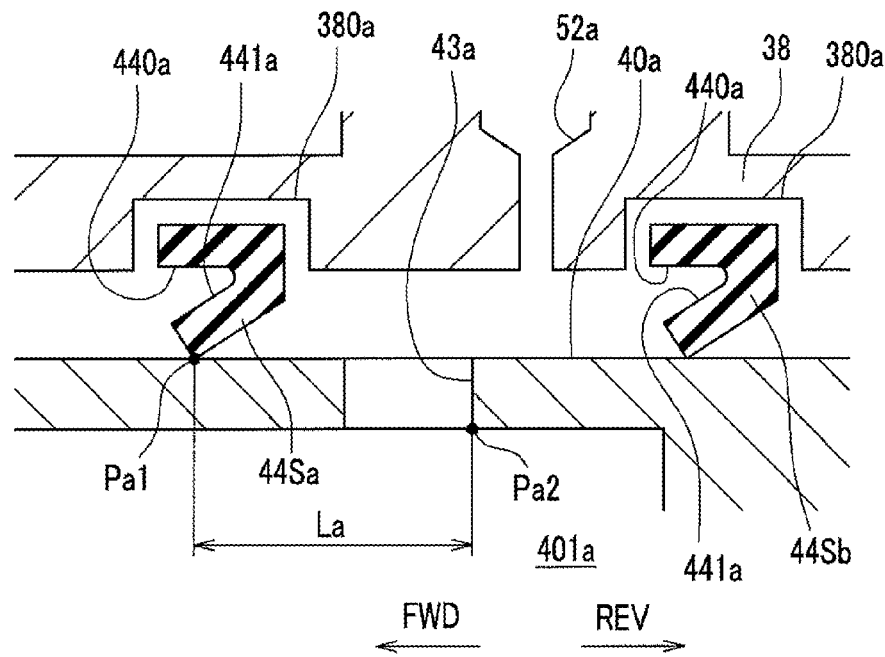
FIG. 3A is a diagram illustrating an arrangement of cup seals in slidable contact with a secondary piston.
Figure 3B:
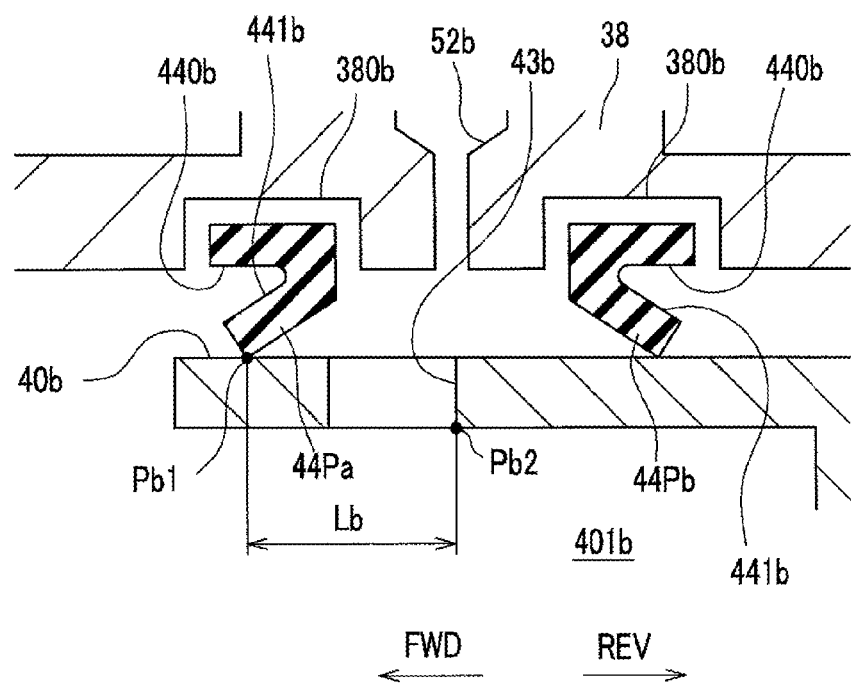
FIG. 3B is a diagram illustrating an arrangement of cup seals in slidable contact with a primary piston.

FIG. 2 is a sectional view illustrating the structure of the master cylinder, FIG. 3A is a diagram illustrating an arrangement of cup seals in slidable contact with the secondary piston, and FIG. 3B is a diagram illustrating an arrangement of cup seals in slidable contact with the primary piston. As illustrated in FIG. 2, the cylinder tube 38 in the master cylinder 34 is formed to close at the side end portion 38a, and the secondary piston 40a and the primary piston 40b are connected in series and enclosed in the cylinder tube 38. Hereinafter, the side end portion 38a side of the cylinder tube 38 is referred to as the forward side FWD, and the pushrod 42 side of the cylinder tube 38 is referred to as the reverse side REV. That is, in the cylinder tube 38, the primary piston 40b is arranged on the forward side FWD of the secondary piston 40a, and the secondary piston 40a is arranged on the reverse side REV of the primary piston 40b.

The secondary piston 40a is formed to have a cylindrical shape and a hollow which opens on the forward side FWD. (The hollow is referred to as the second hollow 401a.) An end of the spring member 50a is inserted into the second hollow 401a inside the secondary piston 40a. Thus, the second hollow 401a opens on the second pressure chamber 56a side and communicates with the second pressure chamber 56a. In addition, a mount portion 402a having a tubular form and extending toward the forward side FWD through the inside of the spring member 50a is arranged inside the second hollow 401a. The end of the mount portion 402a on the forward side FWD is closed except that a through-hole is arranged in the closed portion, and a guide rod 48a is arranged through the through-hole. The diameter of the tip end of the guide rod 48a, which is located inside the mount portion 402a, is greater than the diameter of the guide rod 48a at the through-hole. In the above arrangement, when the guide rod 48a is displaced toward the forward side FWD, the secondary piston 40a is pulled by the guide rod 48a, and displaced toward the forward side FWD.

Similarly, the primary piston 40b is formed to have a cylindrical shape and a hollow which opens on the forward side FWD. (The hollow is referred to as the second hollow 401b.) An end of the spring member 50b is inserted into the second hollow 401b inside the primary piston 40b, so that the first hollow 401*b* opens on the first pressure chamber 56*b* side and communicates with the first pressure chamber 56*b*. In addition, a mount portion 402*b* having a tubular form and extending toward the forward side FWD through the spring member 50*b* is arranged inside the first hollow 401*b*. The end of the mount portion 402*b* on the forward side FWD is closed except that a through-hole is arranged in the closed portion, and a guide rod 48*b* is arranged through the through-hole. The diameter of the tip end of the guide rod 48*b*, which is located inside the mount portion 402*b*, is greater than the diameter of the guide rod 48*b* at the through-hole. According to the above arrangement, the amount of displacement of the primary piston 40*b* toward the reverse side REV is limited by the guide rod 48*b*.

In addition, a plurality of second communication openings (second port openings 43*a*) are arranged in the cylindrical portion of the secondary piston 40*a* (the peripheral wall surrounding the second hollow 401*a*), so that the second hollow 401*a* communicates with the inside of the cylinder tube 38 through the second port openings 43*a*. The master cylinder 34 is configured such that the second relief port 52*a* and the second hollow 401*a* come to communicate with each other through the second port openings 43*a* when the second port openings 43*a* moves to the interval between the cup seals 44Sa and 44Sb by slidable movement of the secondary piston 40*a*. When the second relief port 52*a* and the second hollow 401*a* communicate with each other, the second pressure chamber 56*a* which communicates with the second hollow 401*a* also communicates with the second relief port 52*a*. Further, the cup seal 44Sa is arranged on the forward side FWD of the second relief port 52*a*, and the other cup seal 44Sb is arranged on the reverse side REV of the second relief port 52*a*. That is, the cup seals 44Sa and 44Sb are respectively arranged on the front and rear sides of the second relief port 52*a*.

As described before, the second relief port 52*a* communicates with the first reservoir 36 (as illustrated in FIG. 1). Therefore, when the second relief port 52*a* and the second hollow 401*a* communicate with each other, the second pressure chamber 56*a* communicates with the first reservoir 36. The first reservoir 36 is a reservoir tank in which the pressure is maintained at the atmospheric pressure, and therefore the pressure of the second pressure chamber 56*a* is reduced to the atmospheric pressure when the second pressure chamber 56*a* comes to communicate with the first reservoir 36. That is, when the second port openings 43*a* comes to communicate with the second relief port 52*a*, the pressure of the second pressure chamber 56*a* is reduced to the atmospheric pressure. In addition, the master cylinder 34 is configured such that the end of the second hollow 401*a* on the forward side FWD is located on the forward side FWD of the cup seal 44Sa at all times.

Further, a plurality of first communication openings (first port openings 43*b*) are arranged in the cylindrical portion of the primary piston 40*b* (the peripheral wall surrounding the first hollow 401*b*), so that the first hollow 401*b* communicates with the inside of the cylinder tube 38 through the first port openings 43*b*. In addition, the master cylinder 34 is configured such that the first relief port 52*b* and the first hollow 401*b* come to communicate with each other through the first port openings 43*b* when the first port openings 43*b* moves to the interval between the cup seals 44Pa and 44Pb by slidable movement of the primary piston 40*b*. When the first relief port 52*b* and the first hollow 401*b* communicate with each other, the first pressure chamber 56*b* communicates with the first relief port 52*b*. Similarly to the second pressure chamber 56*a*, the pressure of the first pressure chamber 56*b* is reduced to the atmospheric pressure when the first pressure chamber 56*b* comes to communicate with the first relief port 52*b*. That is, when the first port openings 43*b* comes to communicate with the first relief port 52*b*, the pressure of the first pressure chamber 56*b* is reduced to the atmospheric pressure.

Further, the cup seal 44Pa is arranged on the forward side FWD of the first relief port 52*b*, and the other cup seal 44Pb is arranged on the reverse side REV of the first relief port 52*b*. That is, the cup seals 44Pa and 44Pb are respectively arranged on the front and rear sides of the first relief port 52*b*. In addition, the master cylinder 34 is configured such that the end of the first hollow 401*b* on the forward side FWD is located on the forward side FWD of the cup seal 44Pa at all times. Hereinafter, the state in which the second port openings 43*a* communicate with the second relief port 52*a* and the state in which the first port openings 43*b* communicate with the first relief port 52*b* are each referred to as an open state. In addition, the state in which the second port openings 43*a* do not communicate with the second relief port 52*a* and the state in which the first port openings 43*b* do not communicate with the first relief port 52*b* are each referred to as a closed state.

Furthermore, the master cylinder 34 is configured such that when the driver does not depress the brake pedal 12 and the brake pedal 12 is in a predetermined home position (as illustrated in FIG. 1), the second port openings 43*a* in the secondary piston 40*a* are located between the cup seals 44Sa and 44Sb, so that the second port openings 43*a* communicate with the second relief port 52*a*. That is, the second port openings 43*a* are in the open state. In addition, the master cylinder 34 is configured such that when the driver does not depress the brake pedal 12 and the brake pedal 12 is in a predetermined home position, the first port openings 43*b* in the primary piston 40*b* are located between the cup seals cup seals 44Pa and 44Pb, so that the first port openings 43*b* communicate with the first relief port 52*b*. That is, the first port openings 43*b* are in the open state. It is assumed that when the driver does not depress the brake pedal 12, the brake pedal 12 returns to the home position by a bias means and the pedal stroke measured by the pedal-stroke sensor St (illustrated in FIG. 1) is zero.

The cup seals 44Sa, 44Sb, 44Pa, and 44Pb are installed by being fitted in tubular grooves 380*a* and 380*b*, each of which has a concave shape as illustrated in FIGS. 3A and 3B. FIGS. 3A and 3B respectively illustrate the arrangement around the secondary piston 40*a* and the arrangement around the primary piston 40*b*. The tubular grooves 380*a* and 380*b* are formed along a circumferential direction on the inner peripheral surface of the cylinder tube 38.

The cup seals 44Sa and 44Sb are each formed of an elastic material such as rubber, and are each constituted by a base portion 440*a* and a tongue portion 441*a* as illustrated in FIG. 3A. Each of the base portions 440*a* and the tongue portions 441*a* has an annular shape. The base portions 440*a* are fitted in the tubular grooves 380*a*, and the tongue portions 441*a* stand from the base portions 440*a* toward the inside surface of the cylinder tube 38 such that the tongue portions 441*a* are in slidable contact with the outer peripheral surface of the secondary piston 40*a*, and flow of the brake fluid is blocked by the slidable contact between the secondary piston 40*a* and the tongue portions 441*a*. Further, when the position at which the cup seal 44Sa arranged on the forward side FWD is in contact with the secondary piston 40*a* is referred to as the contact position Pa1, and the position corresponding to the reverse side extremities of the edges of the second port openings 43*a* in the secondary piston 40*a* is referred to as the position Pa2, a dead stroke La is defined as the distance between the contact position Pa1 and the position Pa2 when the brake pedal 12 is not depressed. In other words, the dead stroke La corresponds to the amount of displacement of the secondary piston 40a toward the forward side FWD since depression of the brake pedal 12 is started until the communication between the second port openings 43a and the second relief port 52a stops (i.e., until the second relief port 52a comes into the closed state).

The cup seals 44Pa and 44Pb are each formed of an elastic material such as rubber, and are each constituted by a base portion 440b and a tongue portion 441b as illustrated in FIG. 3B. Each of the base portions 440b and the tongue portions 441b has an annular shape. The base portions 440b are fitted in the tubular grooves 380b, and the tongue portions 441b stand from the base portions 440b toward the inside surface of the cylinder tube 38 such that the tongue portions 441b are in slidable contact with the outer peripheral surface of the primary piston 40b, and flow of the brake fluid is blocked by the slidable contact between the primary piston 40b and the tongue portions 441b. Further, when the position at which the cup seal 44Pa arranged on the forward side FWD is in contact with the primary piston 40b is referred to as the contact position Pb1, and the position corresponding to the reverse side extremities of the edges of the first port openings 43b in the primary piston 40b is referred to as the position Pb2, a dead stroke Lb is defined as the distance between the contact position Pb1 and the position Pb2 when the brake pedal 12 is not depressed. In other words, the dead stroke Lb corresponds to the amount of displacement of the primary piston 40b toward the forward side FWD since depression of the brake pedal 12 is started until the communication between the first port openings 43b and the second relief port 52b stops (i.e., until the second relief port 52b comes into the closed state).

That is, the master cylinder 34 is configured such that when the driver does not depress the brake pedal 12 and the brake pedal 12 is in the predetermined home position, the distance between the contact position Pa1 and the position Pa2 is equal to the dead stroke La and the distance between the contact position Pb1 and the position Pb2 is equal to the dead stroke Lb (where the contact position Pa1 is the position at which the cup seal 44Sa arranged on the forward side FWD is in contact with the secondary piston 40a, the position Pa2 is the position corresponding to the reverse side extremities of the edges of the second port openings 43a in the secondary piston 40a, the contact position Pb1 is the position at which the cup seal 44Pb arranged on the forward side FWD is in contact with the primary piston 40b, and the position Pb2 is the position corresponding to the reverse side extremities of the edges of the first port openings 43b in the primary piston 40b).

In addition, in the master cylinder 34 (illustrated in FIG. 2), the dead stroke Lb of the primary piston 40b is set smaller than the dead stroke La of the secondary piston 40a (i.e., Lb<La).

When the driver depresses the brake pedal 12 (illustrated in FIG. 1), the brake pedal 12 is displaced from the predetermined home position toward the forward side FWD, and the push rod 42 (illustrated in FIG. 1) is pushed by the brake pedal 12 and displaced toward the forward side FWD. Then, the secondary piston 40a is pushed by the pushrod 42 and displaced toward the forward side FWD. When the second port openings 43a go beyond the position of the cup seal 44Sa (which is arranged on the forward side FWD), the communication between the second port openings 43a and the second relief port 52a stops, i.e., the second relief port 52a comes into the closed state.

In addition, the spring member 50a (illustrated in FIG. 2) is compressed by the displacement of the secondary piston 40a, so that the primary piston 40b is pushed by the compressed spring member 50a and displaced toward the forward side FWD. When the first port openings 43b go beyond the position of the cup seal 44Pa (which is arranged on the forward side FWD), the communication between the first port openings 43b and the first relief port 52b stops, i.e., the first relief port 52b comes into the closed state. When both of the first and second port openings 43b and 43a come into the closed state, hydraulic pressure corresponding to the displacement of the brake pedal 12 is generated in each of the first and second pressure chambers 56b and 56a (illustrated in FIG. 2), and the brake fluid in the first pressure chamber 56b is supplied to the stroke simulator 64 (illustrated in FIG. 2) through the first hydraulic path 58b (illustrated in FIG. 2).

Further, when the second port openings 43a in the secondary piston 40a comes into the closed state, the second pressure chamber 56a becomes a closed space which is shut off from the atmospheric pressure, and the hydraulic pressure of the second pressure chamber 56a rises because of depression by the pushrod 42 and the secondary piston 40a. Then, the hydraulic pressure of the second pressure chamber 56a pushes the primary piston 40b. Furthermore, when the first port openings 43b in the primary piston 40b comes into the closed state, the first pressure chamber 56b becomes a closed space which is shut off from the atmospheric pressure, and the hydraulic pressure of the first pressure chamber 56b rises because of depression by the primary piston 40b and pressurization by the stroke simulator 64.

When the driver releases the brake pedal 12 after depression of the brake pedal 12, the primary piston 40b is pressed by the hydraulic pressure of the first pressure chamber 56b and the spring member 50b (illustrated in FIG. 2), and displaced toward the reverse side REV. Then, the secondary piston 40a is pressed by the hydraulic pressure of the second pressure chamber 56a and the spring member 50a (illustrated in FIG. 2) and displaced toward the reverse side REV.

Figure 4A:
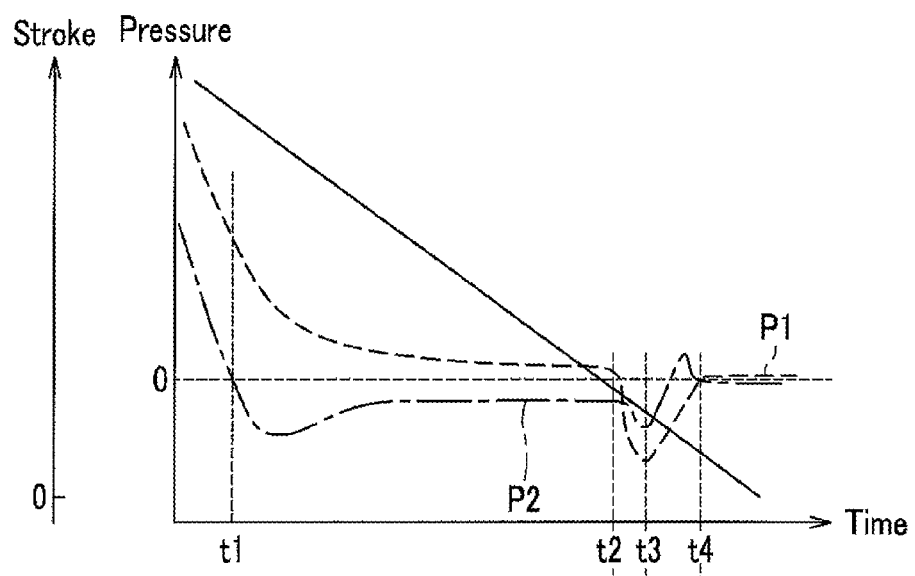
FIG. 4A indicates variations in hydraulic pressures in first and second pressure chambers in a conventional master cylinder when a brake pedal is released after being depressed.
Figure 4B:
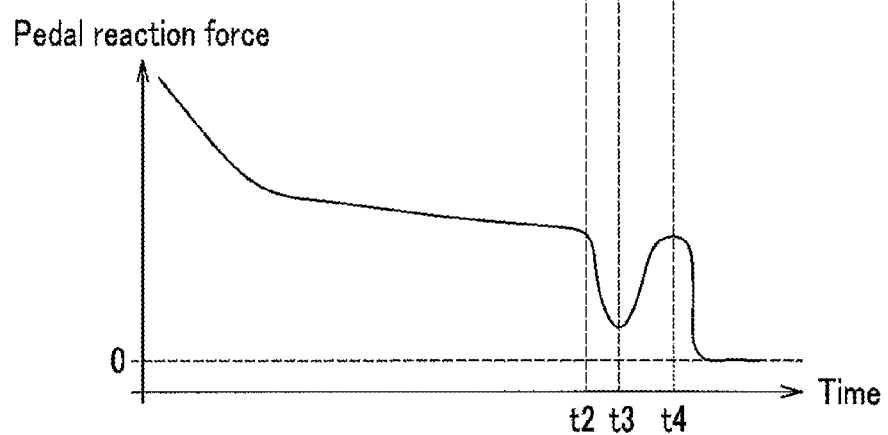
FIG. 4B indicates variations in pedal reaction force occurring in the brake pedal in cooperation with the conventional master cylinder.

FIG. 4A indicates variations in hydraulic pressures in first and second pressure chambers in a conventional master cylinder when a brake pedal is released after being depressed, and FIG. 4B indicates variations in pedal reaction force in the brake pedal in cooperation with the conventional master cylinder. In FIG. 4A, the ordinate corresponds to the pressure and the stroke, the abscissa corresponds to the (elapsed) time, the dashed curve indicates variations in the hydraulic pressure P1 of the first pressure chamber 56b, the dot-and-dash curve indicates variations in the hydraulic pressure P2 of the second pressure chamber 56a, the solid curve indicates the stroke of the brake pedal 12 measured by the pedal-stroke sensor St, and the pressure "0" corresponds to the atmospheric pressure. In FIG. 4B, the ordinate corresponds to the pedal reaction force, and the abscissa corresponds to the (elapsed) time. The variations in the hydraulic pressures in the first and second pressure chambers 56b and 56a are explained below with reference to FIGS. 4A and 4B (and to FIGS. 1 and 2 when necessary).

When the driver releases the brake pedal 12 after depression of the brake pedal 12, the primary piston 40b is displaced toward the reverse side REV by elastic force of the spring member 50b which is compressed. At this time, the brake fluid is supplied from the stroke simulator 64 to the first pressure chamber 56b, so that the hydraulic pressure of the first pressure chamber 56b becomes higher than the hydraulic pressure of the second pressure chamber 56a.

The displacement of the pistons 40a and 40b toward the reverse side REV reduces the hydraulic pressures P1 and P2 of the first and second pressure chambers 56b and 56a, so that the hydraulic pressure P2 of the second pressure chamber 56a, which is lower than the hydraulic pressure P1 of the first pressure chamber 56b, becomes negative at time t1. Thereafter, when the simulator piston 68 in the stroke simulator 64 returns to the home position at time t2, the supply of the brake fluid from the stroke simulator 64 to the first pressure chamber 56b stops. Since the primary piston 40b is displaced toward the reverse side REV by the elastic force of the spring member 50b even after time t2, the volume of the first pressure chamber 56b increases even after time t2 and the hydraulic pressure P1 becomes negative.

When the hydraulic pressure P1 of the first hydraulic chamber 56b becomes negative after time t2, the primary piston 40b is instantaneously pulled back toward the forward side FWD, and the volume of the second hydraulic chamber 56a instantaneously increases, so that the magnitude of the negative pressure of the hydraulic pressure P2 increases (in the time interval from time t2 to time t3). In this way, in the time interval from time t2 to time t3, the secondary piston 40a and the primary piston 40b are irregularly displaced. However, as a whole, the secondary piston 40a and the primary piston 40b are displaced by the elastic force toward the reverse side REV.

Thereafter, at time t3, the second port openings 43a go toward the reverse side REV beyond the position of the cup seal 44Sa and come to communicate with the second relief port 52a, and the first port openings 43b go toward the reverse side REV beyond the position of the cup seal 44Pa and come to communicate with the first relief port 52b. That is, the second port openings 43a and the first port openings 43b come into the open state at time t3.

As indicated in FIG. 4B, the pedal reaction force occurring in the brake pedal 12 decreases with the hydraulic pressure P1 of the first pressure chamber 56b and the hydraulic pressure P2 of the second pressure chamber 56a. In particular, the pedal reaction force occurring in the brake pedal 12 rapidly decreases in the time interval from time t2 (after which the hydraulic pressures P1 and P2 become negative) to time t3 (at which the second port openings 43a and the first port openings 43b come into the open state) as indicated in FIG. 4B. This is because the secondary piston 40a is instantaneously pulled back toward the forward side FWD by the negative hydraulic pressure P2 the magnitude of which is increased.

After time t3, the brake fluid flows into the first hollow 401b of the primary piston 40b through the first port openings 43b which is in the open state, and the hydraulic pressure P1 of the first pressure chamber 56b rises to the atmospheric pressure. Similarly, the brake fluid flows into the second hollow 401a of the secondary piston 40a through the second port openings 43a, and the hydraulic pressure P2 of the second pressure chamber 56a rises to the atmospheric pressure (at time t4). As the hydraulic pressure P1 of the first pressure chamber 56b and the hydraulic pressure P2 of the second pressure chamber 56a rise to the atmospheric pressure, the primary piston 40b and the secondary piston 40a are promoted to be displaced toward the reverse side REV, and the brake pedal 12 is also promoted to be displaced toward the reverse side REV. Thereafter, the brake pedal 12 is displaced toward the reverse side REV until the stroke becomes "0", which corresponds to the home position of the brake pedal 12.

In the time interval from time t3 to time t4, the hydraulic pressure P1 of the first pressure chamber 56b rapidly rises from the negative pressure to the atmospheric pressure, and the primary piston 40b is promoted to be displaced toward the reverse side REV by being pushed by the hydraulic pressure P1. In conjunction with the displacement of the primary piston 40b, the secondary piston 40a is also promoted to be displaced toward the reverse side REV, so that the brake pedal 12 is also promoted to be displaced toward the reverse side REV. As a result, the pedal reaction force in the brake pedal 12 rapidly increases in the time interval from time t3 to time t4 as indicated in FIG. 4B. The rapid increase in the pedal reaction force causes turbulence in the rate of displacement of the brake pedal 12. Therefore, when the driver's foot is on the brake pedal 12, the driver will feel a sense of incongruity, i.e., the brake feel is worsened.

The turbulence in the rate of displacement of the brake pedal 12 (the rapid variations in the pedal reaction force) is caused by the lowering of the hydraulic pressure P1 of the first pressure chamber 56b to the negative pressure and the subsequent rapid rise of the hydraulic pressure P1 which occur in the time interval from time t2 to time t4. Therefore, if the rapid rise of the hydraulic pressure P1 of the first pressure chamber 56b which occurs in the time interval from time t2 to time t4 can be suppressed, the sense of incongruity which the driver feels can be reduced.

In consideration of the above situation, the master cylinder 34 according to the present embodiment is configured such that the flow rate at which the brake fluid can flow between the first pressure chamber 56b and the first reservoir 36 is lower than the flow rate at which the brake fluid can flow between the second pressure chamber 56a and the first reservoir 36. Specifically, the master cylinder 34 is configured such that the number of the first port openings 43b which open in the primary piston 40b is smaller than the number of the second port openings 43a which open in the secondary piston 40a in the case where the aperture area per each of the first port openings 43b in the primary piston 40b is equal to the aperture area per each of the second port openings 43a in the secondary piston 40a.

According to the above configuration, the flow rate at which the brake fluid flows into the first hollow 401b is different from the flow rate at which the brake fluid flows into the second hollow 401a. Therefore, even when the first port openings 43b and the second port openings 43a are concurrently open, the timing of the rise from the negative pressure to the atmospheric pressure (the time needed for the pressure rise, e.g., the time interval from time t3 to time t4 in FIG. 4B) is different between the hydraulic pressure P1 of the first pressure chamber 56b and the hydraulic pressure P2 of the second pressure chamber 56a. Specifically, in the present embodiment, the hydraulic pressure P2 of the second pressure chamber 56a more rapidly rise than the hydraulic pressure P1 of the first pressure chamber 56b. Therefore, the timing of the rise of the hydraulic pressure P1 of the first pressure chamber 56b is different from the timing of the rise of the hydraulic pressure P2 of the second pressure chamber 56a, so that the pedal reaction force occurring in the brake pedal 12 is reduced and the sense of incongruity which the driver feels is also reduced.

In addition, the master cylinder 34 is configured such that the dead stroke La of the secondary piston 40a is longer than the dead stroke Lb of the primary piston 40b. Therefore, as mentioned before, when the secondary piston 40a and the primary piston 40b are displaced toward the reverse side REV, the second port openings 43a in the secondary piston 40a come into the open state in advance of the first port openings 43b in the primary piston 40b. Since the timing at which the first port openings 43b come into the open state is different from the timing at which the second port openings 43a come into the open state, the timing at which the hydraulic pressure P1 of the first pressure chamber 56b rises becomes different from the timing at which the hydraulic pressure P2 of the second pressure chamber 56a rises, so that pedal reaction force occurring in the brake pedal 12 is reduced and the sense of incongruity which the driver feels is also reduced.

Figure 5A:
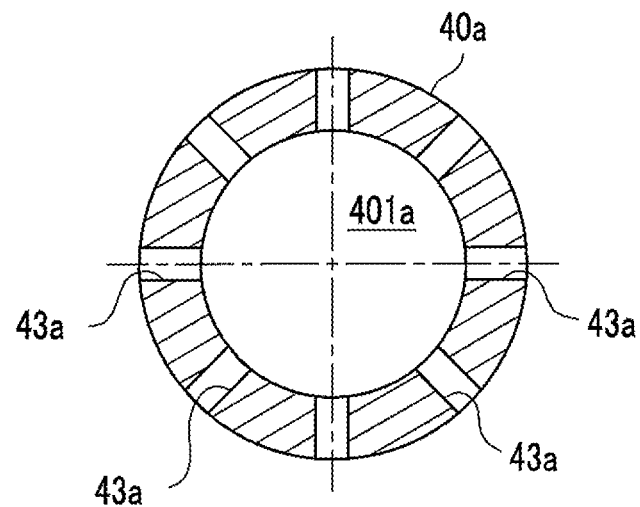
FIG. 5A is a cross-sectional view illustrating an example of arrangement of second port openings which open in the secondary piston.
Figure 5B:
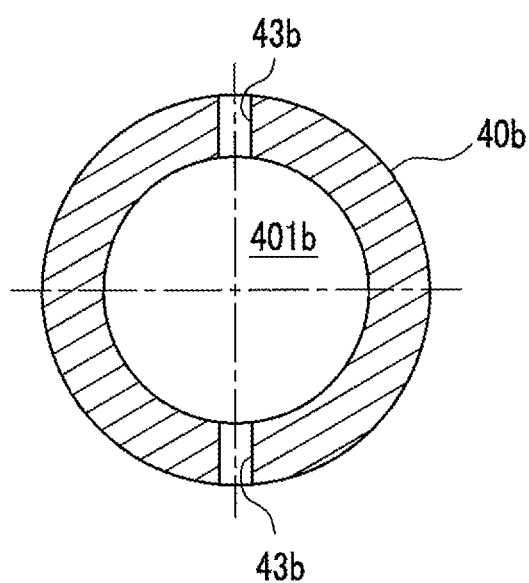
FIG. 5B is a cross-sectional view illustrating an example of arrangement of first port openings which open in the primary piston.

FIG. 5A is a cross-sectional view illustrating an example of arrangement of the second port openings 43a which open in the secondary piston 40a, and FIG. 5B is a cross-sectional view illustrating an example of arrangement of the first port openings 43b which open in the primary piston 40b. For example, eight second port openings 43a are arranged in the wall portion surrounding the second hollow 401a in the secondary piston 40a to be equally spaced in the circumferential direction as indicated in FIG. 5A, and two first port openings 43b are arranged in the wall portion surrounding the first hollow 401b in the primary piston 40b to be equally spaced in the circumferential direction as indicated in FIG. 5B. According to the above arrangement, it is possible to make the flow rate at which the brake fluid can flow between the first pressure chamber 56b and the first reservoir 36 a quarter of the flow rate at which the brake fluid can flow between the second pressure chamber 56a and the first reservoir 36.

Figure 6A:
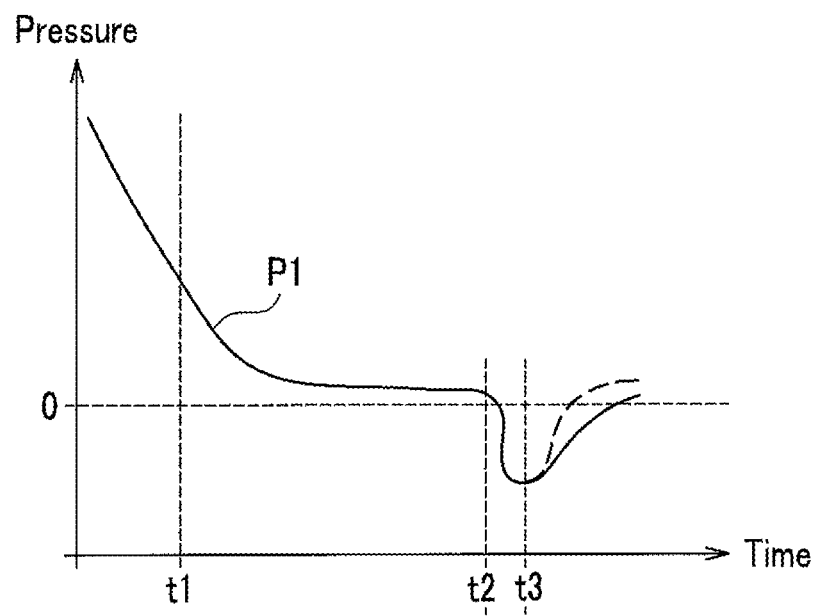
FIG. 6A indicates variations in the hydraulic pressure in the first pressure chamber when the brake pedal is released in the case where two first port openings are arranged in the primary piston and eight second port openings are arranged in the secondary piston in the master cylinder.
Figure 6B:
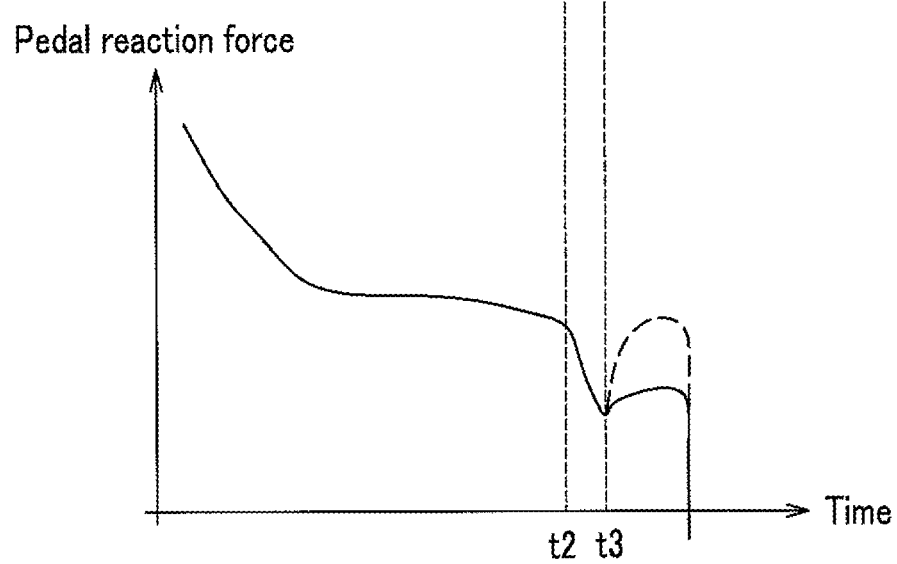
FIG. 6B indicates variations in the pedal reaction force in the case where two first port openings are arranged in the primary piston and eight second port openings are arranged in the secondary piston in the master cylinder.

FIG. 6A indicates variations in the hydraulic pressure P1 in the first pressure chamber 56b in the master cylinder 34 when the brake pedal 12 is released in the case where two first port openings 43b are opened in the primary piston 40b and eight second port openings 43a are opened in the secondary piston 40a, and FIG. 6B indicates variations in the pedal reaction force in the case where two first port openings 43b are opened in the primary piston 40b and eight second port openings 43a are opened in the secondary piston 40a in the master cylinder 34.

In FIG. 6A, the ordinate corresponds to the pressure, and the abscissa corresponds to the (elapsed) time. In FIG. 6B, the ordinate corresponds to the pedal reaction force, and the abscissa corresponds to the (elapsed) time. In FIGS. 6A and 6B, the solid curves indicate the variations in the present embodiment, and the dashed curves indicate the variations in a conventional example in which eight first port openings are arranged in the primary piston. When the brake pedal 12 is released, the primary piston 40b and the secondary piston 40a are displaced toward the reverse side REV, and the first port openings 43b in the primary piston 40b come into the open state at time t3 indicated in FIG. 6A. Then, the hydraulic pressure P1 in the first pressure chamber 56b, which is negative since the time t2, rises from the negative pressure to the atmospheric pressure. Since the number of the first port openings 43b is two in the present embodiment while the number of the first port openings 43b is eight in the conventional example, the flow rate at which the brake fluid flows into the first hollow 401b in the primary piston 40b in the present embodiment is smaller than the flow rate in the conventional example, so that the hydraulic pressure P1 in the present embodiment (indicated by the solid curve in FIG. 6A) is more slowly rises than the conventional example (indicated by the dashed curve in FIG. 6A).

Therefore, the rising rate of the hydraulic pressure P1 in the first pressure chamber 56b become different from the rising rate of the hydraulic pressure P2 of the second pressure chamber 56a, so that the timing at which the hydraulic pressure P1 in the first pressure chamber 56b rises become different from the timing at which the hydraulic pressure P2 of the second pressure chamber 56a rises. Thus, the pedal reaction force occurring in the brake pedal 12 in the explained embodiment (indicated by the solid curve in FIG. 6B) more slowly rises than the conventional example (indicated by the dashed curve in FIG. 6B). That is, it is possible to suppress the rapid rise of the pedal reaction force, and reduce the pedal reaction force occurring in the brake pedal 12 and the sense of incongruity which the driver feels.

As explained above, the number of the first port openings 43b formed around the first hollow 401b in the primary piston 40b is smaller than the number of the second port openings 43a formed around the second hollow 401a in the secondary piston 40a. Therefore, it is possible to suppress the rapid rise of the pedal reaction force occurring in the brake pedal 12 when the primary piston 40b is displaced toward the reverse side REV, and reduce the turbulence in the rate of displacement of the brake pedal 12.

In addition, as explained above, in the master cylinder 34 in the vehicle brake system 10 according to the explained embodiment (illustrated in FIG. 1), the number of the first port openings 43b being formed in the primary piston 40b and communicating the first pressure chamber 56b and the first reservoir 36 (as illustrated in FIG. 2) is smaller than the number of the second port openings 43a being formed in the secondary piston 40a and communicating the second pressure chamber 56a and the first reservoir 36 (as illustrated in FIG. 2). In the illustrated example, the number of the first port openings 43b formed in the primary piston 40b is two while the number of the second port openings 43a formed in the secondary piston 40a is eight. According to the above arrangement, it is possible to suppress the rapid rise of the pedal reaction force occurring in the brake pedal 12 when the primary piston 40b is displaced toward the reverse side REV, and reduce the turbulence in the rate of displacement of the brake pedal 12 and the sense of incongruity which the driver feels.

Further, the master cylinder 34 is configured such that the stroke (the dead stroke La) of the brake pedal 12 from depression of the brake pedal 12 is started until the second port openings 43a in the secondary piston 40a come into the closed state is longer than the stroke (the dead stroke Lb) of the brake pedal 12 from depression of the brake pedal 12 is started until the first port openings 43b in the primary piston 40b come into the closed state. According to the above arrangement, it is possible to bring the second port openings 43a in the secondary piston 40a into the open state in advance of the first port openings 43b in the primary piston 40b when the brake pedal 12 is displaced toward the reverse side REV. That is, when the secondary piston 40a and the primary piston 40b are displaced toward the reverse side REV, the second pressure chamber 56a comes to communicate with the first reservoir 36 in advance of the first pressure chamber 56b. (See FIGS. 1 and 2.)

Since, when the secondary piston 40a and the primary piston 40b are displaced toward the reverse side REV, the second port openings 43a in the secondary piston 40a come into the open state in advance of the first port openings 43b in the primary piston 40b, i.e., the timing at which the first port openings 43b come into the open state is different from the timing at which the second port openings 43a come into the open state. Therefore, the timing at which the hydraulic pressure P1 in the first pressure chamber 56b rises and the timing at which the hydraulic pressure P2 of the second pressure chamber 56a rises become different. Thus, it is possible to reduce the pedal reaction force occurring in the brake pedal 12 and the sense of incongruity which the driver feels.

In the explained embodiment, the diameters of the first port openings 43b formed in the primary piston 40b and the second port openings 43a formed in the secondary piston 40a are identical, and the number of the first port openings 43b in the primary piston 40b is different from the number of the second port openings 43a in the primary piston 40b as illustrated in FIGS. 5A and 5B. However, the present invention is not limited to the above arrangement. For example, the first port openings 43b and the second port openings 43a may be arranged such that the number of the first port openings 43b in the primary piston 40b is identical to the number of the second port openings 43a in the primary piston 40b and the aperture area of the first port openings 43b is smaller than the aperture area of the second port openings 43a. Even in such an arrangement, it is possible to make the flow rate at which the brake fluid can flow through the first port openings 43b lower than the flow rate at which the brake fluid can flow through the second port openings 43a.

For example, in the case where the aperture area of each of the first port openings 43b is made smaller than the aperture area of each of the second port openings 43a, the flow rate at which the brake fluid can flow through the first port openings 43b can be made lower than the flow rate at which the brake fluid can flow through the second port openings 43a. Therefore, even in this case, it is possible to achieve advantageous effects similar to the advantageous effects of the arrangement of the explained embodiment in which the two first port openings 43b formed in the primary piston 40b and the eight second port openings 43a formed in the secondary piston 40a have identical diameters.

The number (eight) of the second port openings 43a in the secondary piston 40a and the number (two) of the first port openings 43b in the primary piston 40b which are illustrated in FIGS. 5A and 5B are examples, and the number of the second port openings 43a and the number of the first port openings 43b are not specifically limited as long as the number of the first port openings 43b is smaller than the number of the second port openings 43a.

Further, the master cylinder 34 may also be arranged such that the aperture area per each of the first port openings 43b in the primary piston 40b is smaller than the aperture area per each of the second port openings 43a in the secondary piston 40a and the number of the first port openings 43b is smaller than the number of the second port openings 43a.

Grease such as rubber grease may be applied to or put, by baking, on the pair of cup seals 44Sa and 44Sb which are in slidable contact with the outer peripheral surface of the secondary piston 40a (as illustrated in FIG. 3A). According to this arrangement, the sliding friction between the secondary piston 40a and the cup seals 44Sa and 44Sb decreases. Therefore, deformation of the cup seals 44Sa and 44Sb accompanied by displacement of the secondary piston 40a can be suppressed, and variations in the volume of the second pressure chamber 56a caused by the deformation of the cup seals 44Sa and 44Sb can also be suppressed, so that variations in the hydraulic pressure P2 accompanied by the variations in the volume of the second pressure chamber 56a caused by the displacement of the secondary piston 40a can be suppressed. Thus, it is possible to suppress turbulence in the rate of displacement of the brake pedal 12 and reduce the sense of incongruity which the driver feels.

Similarly, grease such as rubber grease may also be applied to or put, by baking, on the pair of cup seals 44Pa and 44Pb which are in slidable contact with the outer peripheral surface of the primary piston 40b (as illustrated in FIG. 3B). According to this arrangement, the sliding friction between the primary piston 40b and the cup seals 44Pa and 44Pb decreases. Therefore, deformation of the cup seals 44Pa and 44Pb accompanied by displacement of the primary piston 40b can be suppressed, and variations in the volume of the first pressure chamber 56b caused by the deformation of the cup seals 44Pa and 44Pb can also be suppressed, so that variations in the hydraulic pressure P1 accompanied by the variations in the volume of the first pressure chamber 56b caused by the displacement of the primary piston 40b can be suppressed. Therefore, it is possible to suppress variations in the rate of displacement of the brake pedal 12 and reduce the sense of incongruity which the driver feels.

Furthermore, the master cylinder 34 (illustrated in FIG. 1) in the explained embodiment is configured such that the dead stroke Lb of the primary piston 40b is smaller than the dead stroke La of the secondary piston 40a as illustrated in FIGS. 3A and 3B. Alternatively, although not shown, the master cylinder 34 may be configured such that the dead stroke Lb of the primary piston 40b is greater than the dead stroke La of the secondary piston 40a, i.e., Lb>La. In this case, preferably, the master cylinder 34 is configured such that the flow rate at which the brake fluid can flow through the second port openings 43a in the secondary piston 40a is lower than the flow rate at which the brake fluid can flow through the first port openings 43b in the primary piston 40b.

Moreover, in the explained embodiment, the master cylinder 34 is configured such that the flow rate at which the brake fluid flows into the first hollow 401b is lower than the flow rate at which the brake fluid flows into the second hollow 401a by making the number of the first port openings 43b in the primary piston 40b smaller than the number of the second port openings 43a in the secondary piston 40a as illustrated in FIGS. 5A and 5B. However, the relationship between the first port openings 43b and the second port openings 43a with respect to the flow rate may be reversed. That is, the master cylinder 34 may be configured such that the flow rate at which the brake fluid flows into the second hollow 401a is lower than the flow rate at which the brake fluid flows into the first hollow 401b. For example, the number of the second port openings 43a in the secondary piston 40a may be made smaller than the number of the first port openings 43b in the primary piston 40b.

What is claimed is:

1. A hydraulic-pressure generator configured to provide a smooth brake feel when a brake pedal returns from a depressed state thereof, said hydraulic-pressure generator comprising:
   a cylinder tube having a cylindrical bore formed therein;
   a secondary piston which is operatively connected with a brake pedal and is which is disposed in, and configured to be displaced in the cylinder tube in response to movement of the brake pedal, the secondary piston having a second hollow formed therein, and a peripheral wall surrounding the second hollow;
   a primary piston which is disposed in, and configured to be displaced in the cylinder tube in response to displacement of the secondary piston, the primary piston having a first hollow formed therein, and a peripheral wall surrounding the first hollow;
   a first pressure chamber which is formed in the cylinder tube and which is configured so as to communicate with the first hollow formed in the primary piston, and to generate a first brake fluid hydraulic pressure corresponding to displacement of the primary piston;

a second pressure chamber which is formed in the cylinder tube and which is configured so as to communicate with the second hollow formed in the secondary piston, and to generate a second brake fluid hydraulic pressure corresponding to displacement of the secondary piston;

a reservoir which reserves brake fluid therein, and which communicates with the cylinder tube through a first relief port and a second relief port;

wherein at least one first communication opening is formed in the peripheral wall of the primary piston, said at least one first communication opening configured to be switched between a first communicating state, in which the at least one first communication opening communicates with the first relief port, and a first non-communicating state in which the at least one first communication opening does not communicate with the first relief port; and at least one second communication opening is formed in the a peripheral wall of the secondary piston, said at least one second communication opening configured to be switched between a second communicating state, in which the at least one second communication opening communicates with the second relief port, and a second non-communicating state in which the at least one second communication opening does not communicate with the second relief port;

wherein a total aperture area of the at least one first communication opening is different from a total aperture area of the at least one second communication opening, whereby a flow rate at which the brake fluid can flow through the at least one first communication opening is different from a flow rate at which the brake fluid can flow through the at least one second communication opening.

2. The hydraulic-pressure generator according to claim 1, wherein the at least one first communication opening comes into the first communicating state, and the at least one second communication opening comes into the second communicating state, when the brake pedal comes to a predetermined home position;

a first dead stroke which is defined as an amount of displacement of the primary piston in a time interval since the brake pedal is pressed down from the predetermined home position until the at least one first communication opening come into the first non-communicating state is different from a second dead stroke which is defined as an amount of displacement of the secondary piston in a time interval since the brake pedal is pressed down from the predetermined home position until the at least one second communication opening comes into the second non-communicating state;

the flow rate at which the brake fluid can flow through the at least one first communication opening is lower than the flow rate at which the brake fluid can flow through the at least one second communication opening in a first configuration where the first dead stroke is shorter than the second dead stroke, and the flow rate at which the brake fluid can flow through the at least one second communication opening is lower than the flow rate at which the brake fluid can flow through the at least one first communication opening in a second configuration where the second dead stroke is shorter than the first dead stroke.

3. The hydraulic-pressure generator according to claim 1, wherein the at least one first communication opening comprises a plurality of first communication openings, the at least one second communication opening comprises a plurality of second communication openings, each of the first communication openings and the second communication openings has an identical aperture area, and the total number of the first communication openings is smaller than the total number of the second communication openings.

4. The hydraulic-pressure generator according to claim 3, wherein the hydraulic-pressure generator is part of a brake-by-wire system, and further comprising a stroke simulator which generates reaction force imparted to the brake pedal when the brake pedal is depressed, wherein the stroke simulator generates the reaction force according to the hydraulic pressure of the brake fluid which is outputted from the first pressure chamber.

5. The hydraulic-pressure generator according to claim 3, wherein a ratio of a total number of the first communication openings to a total number of the second communication openings is determined by establishing a rate of pressure change differential, between the first and second hydraulic chambers, necessary to eliminate or substantially minimize a turbulent reactive force experienced at the brake pedal by an operator.

6. The hydraulic-pressure generator according to claim 1, wherein the hydraulic-pressure generator is part of a brake-by-wire system, and further comprising a stroke simulator which generates reaction force imparted to the brake pedal when the brake pedal is depressed, wherein the stroke simulator generates the reaction force according to the hydraulic pressure of the brake fluid which is outputted from the first pressure chamber.

7. A hydraulic-pressure generator configured to provide a smooth brake feel when a brake pedal returns from a depressed state thereof, said hydraulic-pressure generator comprising:

a cylinder tube having a cylindrical bore formed therein;

a secondary piston which is operatively connected with a brake pedal and is which is disposed in, and configured to be displaced in the cylinder tube in response to movement of the brake pedal, the secondary piston having a second hollow formed therein, and a peripheral wall surrounding the second hollow;

a primary piston which is disposed in, and configured to be displaced in the cylinder tube in response to displacement of the secondary piston, the primary piston having a first hollow formed therein, and a peripheral wall surrounding the first hollow;

a first pressure chamber which is formed in the cylinder tube and which is configured so as to communicate with the first hollow formed in the primary piston, and to generate a first brake fluid hydraulic pressure corresponding to displacement of the primary piston;

a second pressure chamber which is formed in the cylinder tube and which is configured so as to communicate with the second hollow formed in the secondary piston, and to generate a second brake fluid hydraulic pressure corresponding to displacement of the secondary piston;

a reservoir which reserves brake fluid therein, and which communicates with the cylinder tube through a first relief port and a second relief port;

wherein a plurality of first communication openings are formed in the peripheral wall of the primary piston, said first communication openings configured to be switched between a first communicating state, in which the first communication openings communicate with the first relief port, and a first non-communicating state in which the first communication openings do not communicate with the first relief port; and a plurality of second communication openings are formed in the peripheral wall of the secondary piston, the second communication openings configured to be switched between a second communicating state, in which the second communication openings communicate with the second relief port, and a second non-communicating state in which the second communication openings do not communicate with the second relief port;

wherein a total aperture area of the plurality of first communication openings is different from a total aperture area of the plurality of second communication openings, whereby a flow rate at which the brake fluid can flow through the first communication openings is different from a flow rate at which the brake fluid can flow through the second communication openings, and wherein a total number of the first communication openings is smaller than a total number of the second communication openings.

8. The hydraulic-pressure generator according to claim 7, wherein:

the first and second communication openings come into the first and second communicating states, respectively, when the brake pedal comes to a predetermined home position;

a first dead stroke which is defined as an amount of displacement of the primary piston in a time interval since the brake pedal is pressed down from the predetermined home position until the first communication openings come into the first non-communicating state is different from a second dead stroke which is defined as an amount of displacement of the secondary piston in a time interval since the brake pedal is pressed down from the predetermined home position until the second communication openings come into the second non-communicating state;

the flow rate at which brake fluid can flow through the first communication openings is lower than the flow rate at which brake fluid can flow through the second communication openings in a first configuration where the first dead stroke is shorter than the second dead stroke, and the flow rate at which brake fluid can flow through the second communication openings is lower than the flow rate at which brake fluid can flow through the first communication openings in a second configuration where the second dead stroke is shorter than the first dead stroke.

9. The hydraulic-pressure generator according to claim 7, wherein each of the first communication openings and the second communication openings has an identical aperture area.

10. The hydraulic-pressure generator according to claim 7, wherein the hydraulic-pressure generator is part of a brake-by-wire system, and further comprising a stroke simulator which generates reaction force imparted to the brake pedal when the brake pedal is depressed, wherein the stroke simulator generates the reaction force according to the hydraulic pressure of the brake fluid which is outputted from the first pressure chamber.

\* \* \* \* \*